United States Patent
Kanamoto

(10) Patent No.: US 8,466,830 B2
(45) Date of Patent: Jun. 18, 2013

(54) ELECTRONIC SCANNING RADAR APPARATUS, RECEIVING WAVE DIRECTION ESTIMATING METHOD, AND COMPUTER-READABLE STORAGE MEDIA STORING RECEIVING WAVE DIRECTION ESTIMATION PROGRAM

(75) Inventor: Junji Kanamoto, Hadano (JP)

(73) Assignee: Honda Elesys Co., Ltd., Kanagawa-Ken (JP)

( * ) Notice: Subject to any disclaimer, the term of this patent is extended or adjusted under 35 U.S.C. 154(b) by 325 days.

(21) Appl. No.: 13/022,388

(22) Filed: Feb. 7, 2011

(65) Prior Publication Data

US 2011/0193740 A1 Aug. 11, 2011

(30) Foreign Application Priority Data

Feb. 8, 2010 (JP) .................................. P2010-025950

(51) Int. Cl.
*G01S 13/58* (2006.01)
*G01S 13/00* (2006.01)

(52) U.S. Cl.
USPC ............................. 342/149; 342/107; 342/147

(58) Field of Classification Search
USPC ............. 342/70–72, 107, 113, 147, 149–154, 342/158
See application file for complete search history.

(56) References Cited

U.S. PATENT DOCUMENTS

| | | | |
|---|---|---|---|
| 6,498,581 B1 * | 12/2002 | Yu ..................................... | 342/90 |
| 6,567,034 B1 * | 5/2003 | Yu ..................................... | 342/16 |
| 7,474,252 B2 * | 1/2009 | Natsume et al. ................. | 342/70 |
| 7,495,605 B1 * | 2/2009 | Sakamoto et al. ............ | 342/118 |
| 7,532,154 B2 * | 5/2009 | Noda ............................. | 342/107 |
| 7,692,574 B2 * | 4/2010 | Nakagawa ..................... | 342/107 |
| 7,724,181 B2 * | 5/2010 | Natsume ....................... | 342/108 |
| 7,907,083 B2 * | 3/2011 | Sakamoto et al. .............. | 342/70 |
| 8,102,309 B2 * | 1/2012 | Nakagawa .................... | 342/147 |

(Continued)

FOREIGN PATENT DOCUMENTS

| | | |
|---|---|---|
| JP | 2006-47282 A | 2/2006 |
| JP | 2006-275840 A | 10/2006 |
| JP | 2009-156582 A | 7/2009 |
| JP | 2009-162688 A | 7/2009 |

OTHER PUBLICATIONS

Ikehara, et al., "Matlab Mutlti-Media Signal Processing Part I: Digital Signal Fundamentals", 2004, Baifukan Co., Ltd.

(Continued)

*Primary Examiner* — Jack W Keith
*Assistant Examiner* — Peter Bythrow
(74) *Attorney, Agent, or Firm* — Arent Fox LLP

(57) ABSTRACT

An electronic scanning radar apparatus includes a transmission unit configured to transmit a transmission wave, and a receiving unit including a plurality of antennas receiving a receiving wave coming from a target. The receiving wave is formed from a reflection wave of the transmission wave reflected at the target. A beat signal generation unit is configured to generate beat signals in response to the transmission wave and the receiving wave. A frequency resolution processing unit is configured to obtain complex number data calculated from beat frequencies having signal levels obtained by performing a frequency resolution for the beat signals based on a predetermined frequency width. A peak detector is configured to detect an existence of the target by detecting peak signal levels of the beat frequencies, and a direction detecting unit is configured to calculate an incoming direction of the receiving wave based on a normal equation having an order.

12 Claims, 21 Drawing Sheets

U.S. PATENT DOCUMENTS

| | | | |
|---|---|---|---|
| 8,232,914 B2 * | 7/2012 | Kuroda et al. | 342/129 |
| 2001/0015698 A1 * | 8/2001 | Tokoro | 342/70 |
| 2003/0085835 A1 * | 5/2003 | Matsui et al. | 342/70 |
| 2003/0112173 A1 * | 6/2003 | Seki et al. | 342/70 |
| 2004/0183713 A1 * | 9/2004 | Kumon et al. | 342/70 |
| 2006/0220945 A1 * | 10/2006 | Ohtake et al. | 342/70 |
| 2009/0040097 A1 * | 2/2009 | Sakamoto et al. | 342/118 |
| 2009/0073026 A1 * | 3/2009 | Nakagawa | 342/107 |
| 2009/0085796 A1 * | 4/2009 | Kuroda et al. | 342/129 |
| 2009/0309784 A1 * | 12/2009 | Natsume | 342/189 |
| 2010/0073216 A1 * | 3/2010 | Sakamoto et al. | 342/70 |
| 2010/0134343 A1 * | 6/2010 | Nakagawa | 342/147 |
| 2012/0274501 A1 * | 11/2012 | Kuwahara et al. | 342/147 |

OTHER PUBLICATIONS

K. Nobuyoshi, "Adaptive Signal Processing Using Array Antennas," 1998 Kagaku Gijutsu Shyuppan, pp. 173-174.

* cited by examiner

FIG. 5

|  | PEAK DURING ASCENT → | | | | |
|---|---|---|---|---|---|
|  | 1 | 2 | 3 | 4 | 5 |
| 1 | $r_{11}$ $v_{11}$ $pu_1$ $pd_1$ | $r_{12}$ $v_{12}$ $pu_2$ $pd_2$ | ... | | |
| 2 | $r_{21}$ $v_{21}$ $pu_1$ $pd_2$ | $r_{22}$ $v_{22}$ $pu_2$ $pd_2$ | | | |
| 3 | ... | | ... | | |
| 4 | | | | | |
| 5 | | | | | $r_{55}$ $v_{55}$ $pu_5$ $pd_5$ |

(PEAK DURING DESCENT ↓)

AFTER DBF, THIS MATRIX WILL BE CREATED FOR THE NUMBER OF ANGLES CH

FIG. 6

| TARGET GROUP NUMBER | DISTANCE | RELATIVE VELOCITY | FREQUENCY POINT |
|---|---|---|---|
| TARGET GROUP NUMBER 1 | $r_1$ | $v_1$ | $f_1$ |
| TARGET GROUP NUMBER 2 | $r_2$ | $v_2$ | $f_2$ |
| TARGET GROUP NUMBER 3 | $r_3$ | $v_3$ | $f_3$ |
| TARGET GROUP NUMBER 4 | $r_4$ | $v_4$ | $f_4$ |
| ⋮ | | | |

FIG. 8

$$\begin{array}{c}\text{FIRST ORDER}\\\text{NORMAL EQUATION}\end{array} \cdots\cdots [C_{x1}(1,1)][\hat{a}_1(1)] = -[C_{x1}(1,0)]$$

$$\begin{array}{c}\text{SECOND ORDER}\\\text{NORMAL EQUATION}\end{array} \cdots\cdots \begin{bmatrix} C_{x2}(1,1) & C_{x2}(1,2) \\ C_{x2}(2,1) & C_{x2}(2,2) \end{bmatrix}\begin{bmatrix}\hat{a}_2(1)\\\hat{a}_2(2)\end{bmatrix} = -\begin{bmatrix}C_{x2}(1,0)\\C_{x2}(2,0)\end{bmatrix}$$

$$\begin{array}{c}\text{THIRD ORDER}\\\text{NORMAL EQUATION}\end{array} \begin{bmatrix} C_{x3}(1,1) & C_{x3}(1,2) & C_{x3}(1,3) \\ C_{x3}(2,1) & C_{x3}(2,2) & C_{x3}(2,3) \\ C_{x3}(3,1) & C_{x3}(3,2) & C_{x3}(3,3) \end{bmatrix}\begin{bmatrix}\hat{a}_3(1)\\\hat{a}_3(2)\\\hat{a}_3(3)\end{bmatrix} = -\begin{bmatrix}C_{x3}(1,0)\\C_{x3}(2,0)\\C_{x3}(3,0)\end{bmatrix}$$

COVARIANCE MATRIX ⎴  AR COEFFICIENT  RIGHT HAND SIDE VECTOR $C_{xM}(*,*), \hat{a}_M$ : COMPLEX NUMBER, $M$ : ORDER

FIG. 9

|  |  | AMPLITUDE OF AR COEFFICIENT | | |
|---|---|---|---|---|
|  |  | a(1) | a(2) | a(3) |
| ONE TARGET (ONE RECEIVING WAVE) | FIRST ORDER | ≅1 | | |
|  | SECOND ORDER | ≠1 | ≠1 | |
|  | THIRD ORDER | ≠1 | ≠1 | ≠1 |
| TWO TARGETS (TWO RECEIVING WAVES) | FIRST ORDER | ≠1 | | |
|  | SECOND ORDER | ≠1 | ≅1 | |
|  | THIRD ORDER | ≠1 | ≠1 | ≠1 |
| THREE TARGETS (THREE RECEIVING WAVES) | FIRST ORDER | ≠1 | | |
|  | SECOND ORDER | ≠1 | ≠1 | |
|  | THIRD ORDER | ≠1 | ≠1 | ≅1 |

1a(1)  2a(2)
3a(3)

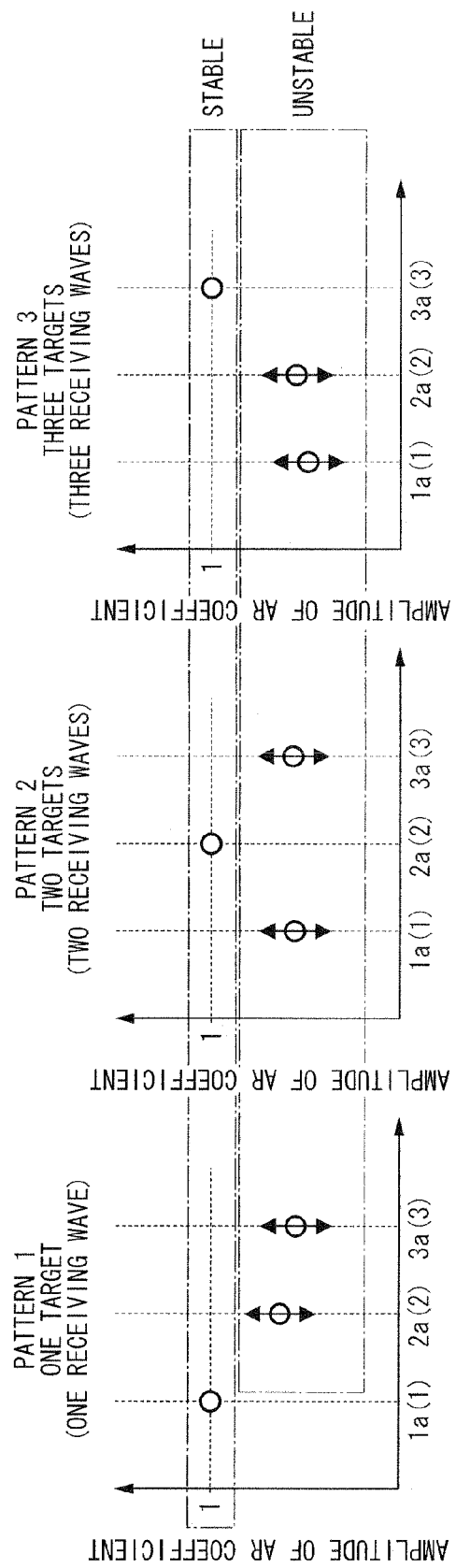

DISTANCE

ESTIMATION IS PERFORMED BASED ON SECOND ORDER FOR SINGLE TARGET

ESTIMATION IS PERFORMED BASED ON THIRD ORDER FOR SINGLE TARGET

FIG. 17

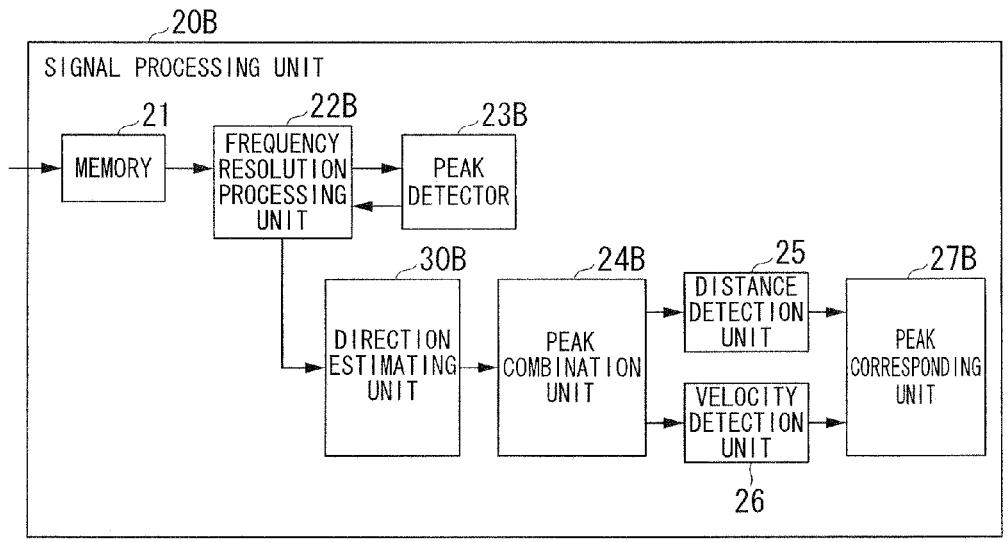

FIG. 18A

ASCENT

|  | ANGLE 1 | ANGLE 2 | ... | FREQUENCY POINT |
|---|---|---|---|---|
| TARGET GROUP NUMBER 1 | $t_1\_ang_1$ | $t_1\_ang_2$ |  | $f_1$ |
| TARGET GROUP NUMBER 2 | $t_2\_ang_1$ | $t_2\_ang_2$ |  | $f_2$ |
| TARGET GROUP NUMBER 3 | $t_3\_ang_1$ | $t_3\_ang_2$ |  | $f_3$ |
| TARGET GROUP NUMBER 4 | $t_4\_ang_1$ | $t_4\_ang_2$ |  | $f_4$ |
| ⋮ |  |  |  |  |

FIG. 18B

DESCENT

|  | ANGLE 1 | ANGLE 2 | ... | FREQUENCY POINT |
|---|---|---|---|---|
| TARGET GROUP NUMBER 1 | $t_1\_ang_1$ | $t_1\_ang_2$ |  | $f_1$ |
| TARGET GROUP NUMBER 2 | $t_2\_ang_1$ | $t_2\_ang_2$ |  | $f_2$ |
| TARGET GROUP NUMBER 3 | $t_3\_ang_1$ | $t_3\_ang_2$ |  | $f_3$ |
| TARGET GROUP NUMBER 4 | $t_4\_ang_1$ | $t_4\_ang_2$ |  | $f_4$ |
| ⋮ |  |  |  |  |

FIG. 20

| TARGET GROUP NUMBER | VERTICAL DISTANCE | VERTICAL POSITION | LATERAL POSITION | RELATIVE VELOCITY | FREQUENCY POINT |
|---|---|---|---|---|---|
| TARGET GROUP NUMBER 1 | $r_1$ | $long\_d_1$ | $late\_d_1$ | $v_1$ | $f_1$ |
| TARGET GROUP NUMBER 2 | $r_2$ | $long\_d_2$ | $late\_d_2$ | $v_2$ | $f_2$ |
| TARGET GROUP NUMBER 3 | $r_3$ | $long\_d_3$ | $late\_d_3$ | $v_3$ | $f_3$ |
| TARGET GROUP NUMBER 4 | $r_4$ | $long\_d_4$ | $late\_d_4$ | $v_4$ | $f_4$ |
| ⋮ | | | | | |

ELECTRONIC SCANNING RADAR
APPARATUS, RECEIVING WAVE DIRECTION
ESTIMATING METHOD, AND
COMPUTER-READABLE STORAGE MEDIA
STORING RECEIVING WAVE DIRECTION
ESTIMATION PROGRAM

BACKGROUND OF THE INVENTION

1. Field of the Invention

The present invention relates to an electronic scanning radar apparatus, a receiving wave direction estimating method, and a computer-readable storage media storing a receiving wave direction estimation program. More particularly, the present invention relates to an electronic scanning radar apparatus being preferable to be equipped in a moving body, a receiving wave direction estimating method, and a computer-readable storage media storing a receiving wave direction estimation program, in which the electronic scanning radar apparatus transmits a transmission wave to a target so as to detect the target by receiving a reflection wave of the transmission wave reflected from the target.

Priority is claimed on Japanese Patent Application No. 2010-025950, filed Feb. 8, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In general, an electronic scanning radar apparatus is known as radar to be equipped for a moving body. For such radar, a frequency modulated continuous wave (FMCW) radar, multiple-frequency continuous wave radar, pulse radar or the like is employed.

For each radar described above, a receiving wave direction estimating method with array antennas is used for detecting the direction of a receiving wave from a target. The receiving wave may be referred to as an incoming wave, and the target may be referred to as a reflecting object.

Recently, the receiving wave direction estimating method employs highly accurate algorithms such as an auto regressive spectral estimation method (AR spectral estimation method; see FIG. 24), a multiple signal classification method (MUSIC method) or the like, which can provide high resolution (high accuracy) of the direction of receiving waves without increasing channels of receiving antennas. These methods are described in Japanese Unexamined Patent Application, First Publication, Nos. 2006-275840, 2006-47282, 2009-162688 and 2009-156582. These methods are also described in "MATLAB Multi-media Signal Processing part I: Digital signal fundamentals" published by Ikehara and Shimamura in 2004 by BAIFUKAN CO., LTD., and described in "Adaptive Signal Processing with Array Antennas" published by Kikuma in 1998 by Kagaku Shuppan Co. LTD.

The AR spectral estimation method is also referred to as a maximum entropy method (MEM) or a linear prediction method.

For estimating the direction of receiving waves from a target (reflecting object) with those algorithms, input data indicated by complex numbers are converted into a matrix form called as a correlation matrix, and then the estimation process is performed. The input data may be referred to as complex sine wave or sine wave.

These algorithms need to be preset an appropriate number of incoming waves (receiving waves). Even when the algorithms are used for a radar mounted on a moving body, appropriate number of receiving waves are determined. For example, an algorithm such as MUSIC method, which estimates the direction of a receiving wave based on calculations of eigenvalues, needs to calculate eigenvalues of correlation matrixes, so that the algorithm determines the relative size of the calculated eigenvalues and separates the signal components from the noise components. Thereby, the direction of a receiving wave is estimated. See patent publications 2 and 3.

An auto regressive spectral estimation method (AR spectral estimation method) is an algorithm which does not require eigenvalue calculations. The AR spectral estimation method can be under relatively small operation load. The AR spectral estimation method includes an advantage which does not require sensitive settings of the number of receiving waves (the order of model) compared to a multiple signal classification method (MUSIC method).

However, when the number of receiving waves is too small for a setting order of a model, the AR spectral estimation method may occasionally cause an error peak. A final prediction error method (FPE method), an akaike information criterion method (AIC method), a minimum description length method (MDL method), and the like are proposed to estimate the number of receiving waves. However, these methods may not always provide an accurate detecting estimation.

There are rare reports on an estimation method of a number of receiving waves which can be applied to a radar system mounted on a moving body with a small number of channels or objects based on a model with a small number of orders. There are rare technical reports that simplified arithmetic operations provide accurate detections.

The present invention takes into consideration the issues described above. One of the objects of this invention is to provide an electronic scanning radar apparatus, a receiving wave direction estimating method, and a computer-readable storage media storing a receiving wave direction estimation program, which make it possible to accurately detect the direction of receiving (incoming) waves from the target while maintaining the accuracy of the signal detections.

In view of the above, it will be apparent to those skilled in the art from this disclosure that there exists a need for an improved apparatus and/or method. This invention addresses the need in the art as well as other needs, which will become apparent to those skilled in the art from this disclosure.

SUMMARY OF THE INVENTION

Accordingly, it is a primary object of an aspect of the invention to provide an electronic scanning radar apparatus, a receiving wave direction estimating method, and a computer-readable storage media storing a receiving wave direction estimation program.

A first aspect of the invention provides an electronic scanning radar apparatus, which is mounted on a moving body. The electronic scanning radar apparatus is mounted on a moving body. The electronic scanning radar apparatus may include, but is not limited to, a transmission unit configured to transmit a transmission wave, and a receiving unit including a plurality of antennas receiving a receiving wave coming from a target. The receiving wave is formed from a reflection wave of the transmission wave reflected at the target. A beat signal generation unit is configured to generate beat signals in response to the transmission wave and the receiving wave, a frequency resolution processing unit is configured to obtain complex number data calculated from beat frequencies having signal levels obtained by performing a frequency resolution for the beat signals based on a predetermined frequency width. A peak detector is configured to detect an existence of the target by detecting peak signal levels of the beat frequencies, and a direction detecting unit is configured to calculate an incoming direction of the receiving wave based on a normal equation having an order. The order is selected in response to a number of receiving waves led from normal equations having different orders. Each of the beat frequencies is obtained from each of the antennas. The normal equations have the different orders formed based on the complex number data of the beat frequencies having detected the existence of the target.

In some cases, the electronic scanning radar apparatus may include, but is not limited to, the direction detecting unit which includes a normal equation generation unit configured to generate the normal equation based on a covariance matrix and a right hand side vector. The covariance matrix and the right hand side vector are obtained from the complex number data having different orders. Each of the normal equations is expressed by a linear equation having elements. The elements may include the covariance matrix, an AR coefficient and the right hand side vector; an AR coefficient calculation unit configured to obtain the AR coefficient having an order corresponding to the order of the normal equation based on an AR model expressed by normal equations having different orders, a determination unit configured to determine a number of receiving waves based on the AR coefficient obtained by the AR coefficient calculation unit; and a power spectrum calculation unit configured to calculate an incoming direction of the receiving wave from a power spectrum obtained based on the AR coefficient having an order selected in response to the number of receiving waves determined from the obtained AR coefficient.

In some cases, the electronic scanning radar apparatus may includes the AR coefficient calculation unit which leads a variance value of white noise having an order of the variance value corresponding to the order of the normal equation based on the AR model, and the determination unit determines the number of the receiving waves based on the variance value and the obtained AR coefficient.

In some cases, for the electronic scanning radar apparatus, the different orders may be a plurality of orders expressed by any natural numbers.

In some cases, the electronic scanning radar apparatus may includes the different orders of the normal equations, which are continuous natural numbers indicated from 1 to any natural number.

In some cases, for the electronic scanning radar apparatus, the order of the normal equation may be set to be greater than a number of targets.

In some cases, for the electronic scanning radar apparatus, when the number of receiving waves is determined to be one, the order of the AR coefficient may be set to be one or two according to the number of the receiving waves.

In some cases, the electronic scanning radar apparatus may further includes a DBF processing unit configured to detect the existence of the target and a direction of the target using a digital beam forming process based on the complex number data, in which the digital beam forming process increases a detecting sensitivity of the receiving waves for a predetermined direction, and the peak detector detects the direction of the target based on the digital beam forming process performed for the beat frequencies.

In some cases, the electronic scanning radar apparatus may includes the DBF processing unit which includes a channel deletion unit configured to calculate spatial complex number data indicating spectrum intensities for respective angle channels corresponding to the predetermined direction determined based on the digital beam forming process of the DBF process unit. When each of the spectrum intensities of adjacent angle channels within a predetermined range of the angle channels exceeds a predetermined threshold level, the channel deletion unit remains each of the spectrum intensities and detects the existence of the target as a DBF target. The channel deletion unit replaces the spectrum intensities of the rest of the angle channels having the intensities smaller than the predetermined threshold level by zero and generates renewed spatial complex number data based on the remained and replaced intensities. The DBF processing unit may includes an IDBF process unit configured to generate restored complex number data by performing an inverse digital beam forming process for the renewed spatial complex number data, in which the normal equation generation unit generates a normal equation by obtaining a correlation matrix from the restored complex number data.

In some cases, for the electronic scanning radar apparatus, when the channel deletion unit detects a plurality of DBF targets, the channel deletion unit divides a spectrum of the DBF targets into channel ranges respectively corresponding to the DBF targets and generates spatial complex number data, and a number of datasets of the spatial complex number data corresponds to a number of the DBF targets. The electronic scanning radar apparatus may includes an IDBF forming unit configured to perform the inverse digital beam forming process for the spatial complex number data and generate renewed complex number data respectively corresponding to the DBF targets, and the normal equation generation unit calculates a correlation matrix for each of the DBF targets based on the renewed complex number data.

It is another aspect of the invention to provide a method of estimating an incoming direction of a receiving wave. The method may includes, but is not limited to, transmitting a transmission wave, receiving a receiving wave by a plurality of antennas, the receiving wave coming from a target, generating beat signals in response to the transmission wave and the receiving wave, performing a frequency resolution for the beat signals into a predetermined number of frequencies and obtaining complex number data, detecting peak signal levels of the beat frequencies and detecting an existence of the target; and calculating an incoming direction of the receiving wave based on a normal equation having an order, the order of the normal equation being selected in response to a number of receiving waves obtained from normal equations, each of the normal equations having different orders formed based on the complex number data of each of the beat frequencies having detected the existence of the target.

In another aspect of the invention, a computer-readable storage media storing a receiving wave direction estimation program for causing a computer to control an electronic scanning radar apparatus, which is mounted on a moving body, the receiving wave direction estimation program may include, but is not limited to, transmitting a transmission wave, receiving a receiving wave by a plurality of antennas, the receiving wave coming from a target, generating beat signals in response to the transmission wave and the receiving wave, performing a frequency resolution for the beat signals into a predetermined number of frequencies and obtaining complex number data, detecting peak signal levels of the beat frequencies and detecting an existence of the target, and calculating an incoming direction of the receiving wave based on a normal equation having an order, the order of the normal equation being selected in response to a number of receiving waves obtained from normal equations, each of the normal equations having different orders formed based on the complex number data of each of the beat frequencies having detected the existence of the target.

As described above, the electronic scanning radar apparatus in accordance with the present invention generates normal equations with different orders, in which the normal equations are led from complex number data that are obtained based on detected receiving waves reflected by targets. The orders of the normal equations are selected based on the number of receiving waves that are led from the normal equations. The electronic scanning radar apparatus can predict the arrival of receiving waves with a light load of arithmetic operations by executing arithmetic operations based on the normal equations of the selected number of orders.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which fatal a part of this original disclosure:

FIG. 5 is an illustration of a matrix of beat frequencies in the ascent and the descent at a peak combination unit 24 of FIG. 1, i.e., showing distances and relative velocities between the target and the electronic scanning radar apparatus obtained by combining the beat frequencies in the ascent and the descent;

FIG. 6 illustrates a data table that shows distances and relative velocities for every target in the present detecting cycle;

FIG. 8 is a diagram which indicates a relationship between normal equations and their orders;

FIG. 9 is a diagram which indicates a relationship between the orders of AR coefficients and the number of targets (the number of receiving waves);

FIGS. 10A, 10B and 10C are diagrams which show different views of the table in FIG. 9;

FIG. 17 is a block diagram that illustrates a signal processing unit of an electronic scanning radar apparatus in accordance with a second preferred embodiment of the present invention;

FIG. 18A illustrates a data table that indicates angles and frequency points of the targets obtained for the ascent;

FIG. 18B illustrates a data table that indicates angles and frequency points of the targets obtained for the descent;

FIG. 20 shows a data table which includes data such as distances, vertical positions, lateral positions, and relative velocities, which have been determined by combination process of data peaks obtained for the ascent and the descent;

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

(AR Spectral Estimation)

In the following, it will be described an autoregressive spectral estimation method (AR spectral estimation method).

The AR spectral estimation method is known as a spectral estimation method, being similar to a multiple signal classification method (MUSIC method), which is shown in "MATLAB Multi-media Signal Processing part I: Digital signal fundamentals" published by Ikehara and Shimamura in 2004 by BAIFUKAN CO., LTD. The AR spectral estimation method performs an estimation process using an autoregressive model (AR model). The AR spectral estimation method is categorized as a parametric method, while MUSIC method is categorized as a subspace method. The AR spectral estimation method is also regarded as a maximum entropy method or a linear prediction method. These methods can also be categorized as parametric methods.

In the AR spectral estimation method, it first models data using the AR model, which is described by a linear equation, and then forms a normal equation based on input data, in which the normal equation includes matrixes such as an auto-correlation matrix and a covariance matrix, and vectors such as a right hand side vector and a correlation vector.

Figure 24:
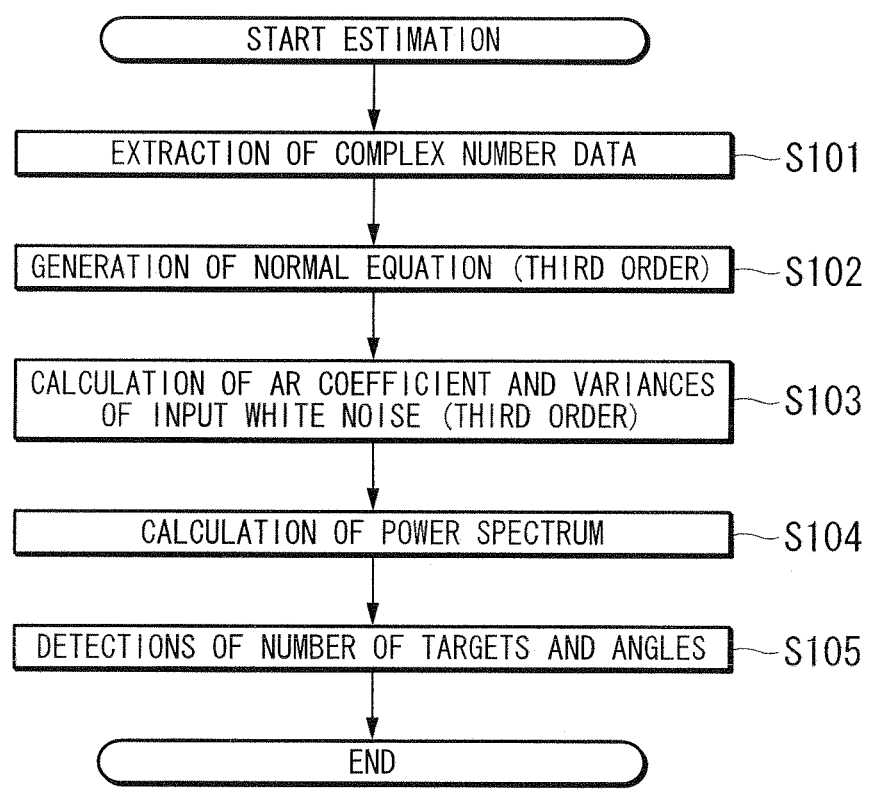
FIG. 24 is a flowchart illustrating an estimation process for AR spectrum in a related art.

Furthermore, a coefficient of AR filter (AR coefficient) and a variance of white noise are determined based on the normal equation. Then, the AR coefficient and the variance of white noise are used to estimate a power spectrum. An example of the estimation process is shown in FIG. 24. For the input data, channel data of the spatial direction of radar according to the present invention can be used as well as time series data or the like. The channel data may be referred to as a complex sinewave. The AR spectral estimation method is roughly classified into a method based on the auto-correlation matrix and another method based on the covariance matrix. The auto-correlation matrix is also used in an auto-correlation method (Yule-Walker method) and a Burg method. The covariance matrix also includes a covariance method and a modified covariance method. In any of the methods mentioned, their algorithm generates a normal equation and calculates AR coefficients and white-noise variance values. Those methods can be applied to the preferred embodiments of the present invention.

In the following, there will be described about an electronic scanning radar apparatus (FMCW millimeter wave radar) in accordance with preferred embodiments of the present invention with reference to figures.

(First Embodiment)

Figure 1:
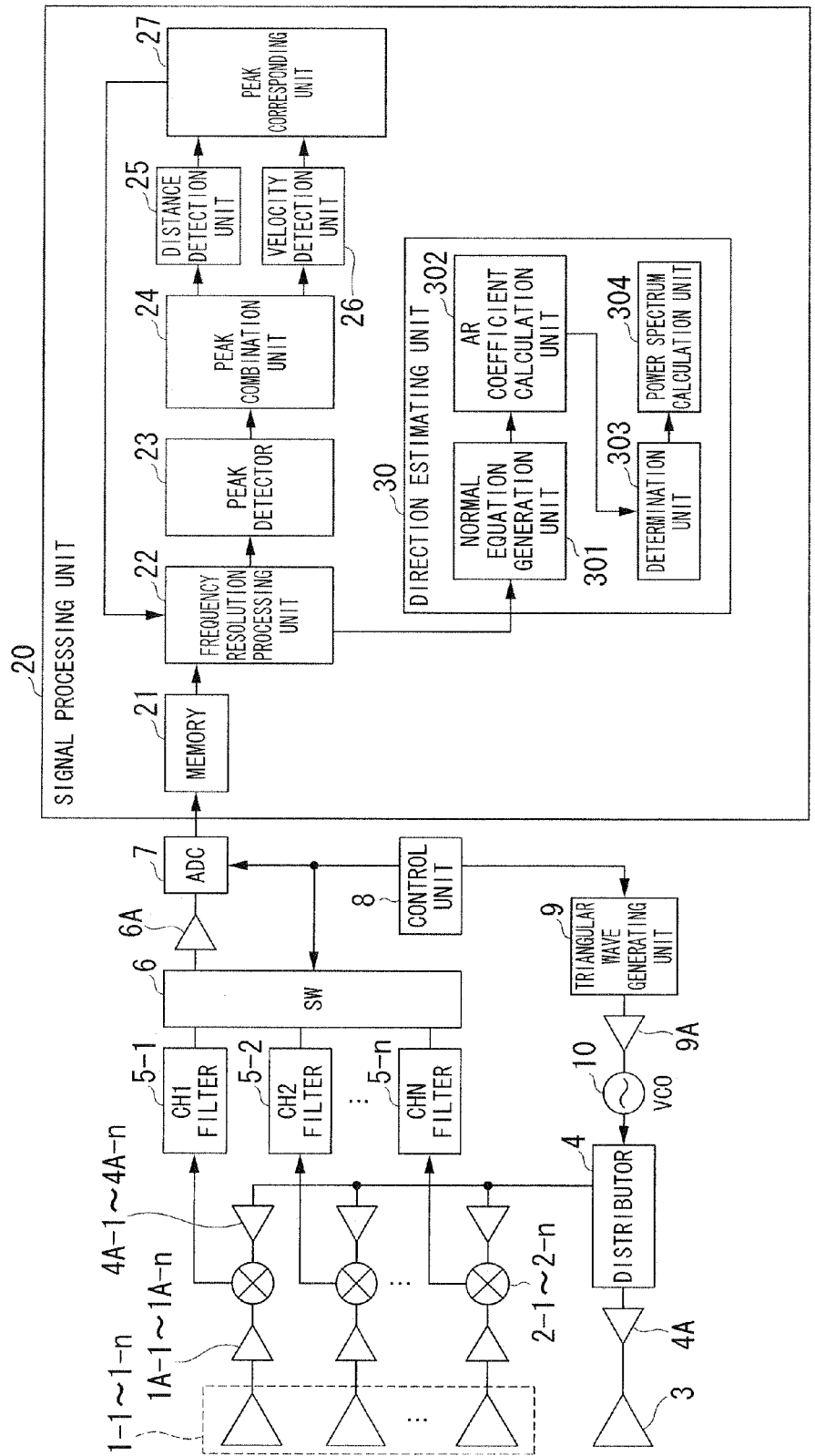
FIG. 1 is a block diagram of an electronic scanning radar apparatus in accordance with a first preferred embodiment of the present invention.

FIG. 1 is a block diagram of an electronic scanning radar apparatus in accordance with a first preferred embodiment of the present invention.

In the figure, the electronic scanning radar apparatus includes receiving antennas 1-1 through 1-n, mixers 2-1 through 2-n, a transmission antenna 3, a distributor 4, channel filters 5-1 through 5-n, a switching unit SW 6, an A/D convertor ADC 7, a control unit 8, a triangular wave generating unit 9, a voltage control oscillator VCO 10, and a signal processing unit 20. Further, there are amplifiers 1A-1 through 1A-n, which are individually provided between the receiving antennas 1-1 through 1-n and the mixers 2-1 through 2-n. Also there are amplifiers 4A-1 through 4A-n provided between the mixers 2-1 through 2-n and the distributor 4. Each of the amplifiers 4A-1 through 4A-n is correspondingly provided to each of the mixers 2-1 through 2-n. Further, an amplifier 4A is provided between the transmission antenna 3 and the distributor 4. There is an amplifier 6A between the SW 6 and the ADC 7. An amplifier 9A is provided between the triangular wave generating unit 9 and the VCO 10.

The signal processing unit 20 includes a memory 21, a frequency divider 22, a peak detector 23, a peak combination unit 24, a distance detection unit 25, a velocity detection unit 26, a peak corresponding unit 27, and a direction estimating unit 30. In the following, the target link may be referred to as the target link unit. The direction estimating unit may be referred to as a direction detecting unit.

Further, the direction estimating unit 30 includes a normal equation generation unit 301, an AR coefficient calculation unit 302, a determination unit 303, and a power spectrum calculation unit 304.

With reference to FIG. 1, the operations of the electronic scanning radar apparatus in accordance with the present embodiment is described.

The receiving antennas 1-1 through 1-n receive incoming waves which come from a target. After the transmission antennas 3 transmits a transmission wave toward the target, a reflection wave is formed at the target by reflection of the transmission wave, and the reflection wave is received by the receiving antennas 1-1 through 1-n as receiving waves. The receiving waves may be referred to as incoming waves. The receiving waves are respectively amplified through the amplifiers 1A-1 through 1A-n after being received by the receiving antennas 1-1 through 1-n. The amplified receiving waves (signals) are mixed at the mixers 2-1 through 2-n with the transmission wave (signal) after passing through the amplifiers 4A-1 through 4A-n.

Then, each of the mixers 2-1 through 2-n generates a beat signal in response to a frequency difference between each of the receiving waves and the transmission wave. The beat signal is transmitted to a corresponding one of channel filters 5-1 through 5-n. The triangular wave generating unit 9 generates triangular wave signals. The triangular wave signals are modulated at the voltage control oscillator VCO 10 after passing through the amplifier 9A.

The transmission antenna 3 transmits the triangular wave signals toward a target (or targets) as transmission waves.

The distributor 4 distributes the transmission signal modulated at the VCO 10 to the mixers 2-1 through 2-n and the transmission antennas 3.

The channel filters 5-1 through 5-n correspond to channels Ch-1 through Ch-n as indicated in FIG. 1. Thus the beat signal generated by each of the mixers 2-1 through 2-n corresponds to one of the channels Ch-1 through Ch-n. The channels Ch-1 through Ch-n also correspond to the receiving antennas 1-1 through 1-n, respectively. Each of the channel filters 5-1 through 5-n performs band limitation for a beat signal in a predetermined range, and transmits a band limited beat signal to the SW 6.

The control unit 8 transmits a sampling signal to the switching unit SW 6. The SW 6 sequentially transmits the beat signal to the beat signal to the ADC 7 in response to the sampling signal, in which the beat signal corresponds to one of the beat signals of Ch-1 through Ch-n. The beat signals of Ch-1 through Ch-n correspond to one of the receiving antennas 1-1 through 1-n, and are synchronized with the sampling signal.

The convertor ADC7 converts the beat signals of Ch-1 through Ch-n into digital signals by A/D converting with synchronizing with the sampling signals. The convertor ADC 7 sequentially stores the converted digital data of the beat signals of Ch-1 through Ch-n into a waveform store area of the memory 21 in the signal processing unit 20.

The control unit 8 may be a micro computer or the like. The control 8 includes ROM (read only memory) or the like which stores a control program or the like. The electronic scanning radar apparatus shown in FIG. 1 is controlled based on the control program.

(Detection Method of Distance, Relative Velocity, and Angle (Direction))

With respect to figures, the present embodiment will be briefly described below regarding methods used to detect distances, relative velocities and angles (directions) between the electronic scanning radar apparatus and a target, in which the methods are used in the signal processing unit 20.

Figure 2A:
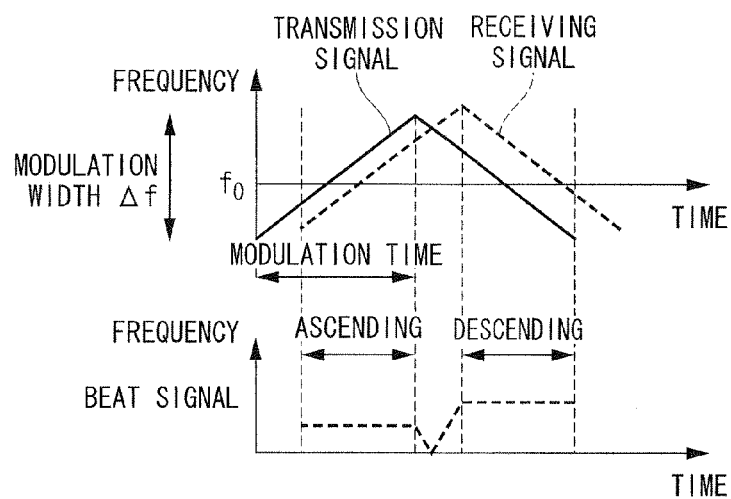
FIG. 2A and FIG. 2B are drawings showing a transmission signal and a reflecting signal reflected from a target received by the electronic scanning radar apparatus.
Figure 2B:
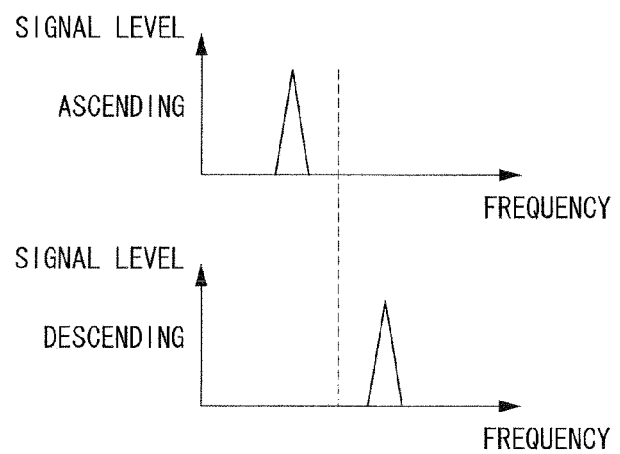

FIG. 2A and FIG. 2B are drawings showing that a transmission signal and a reflecting signal reflected from a target received by the electronic scanning radar apparatus.

The figures show conditions where a transmission signal and a received signal are input into the signal processing unit 20. The received signal is caused by an incoming wave which is a reflection wave of the transmission signal reflected by the target. In the figures, the transmission signal is formed by modulating a signal generated at the triangular wave generating unit 9. The modulation is performed using the VCO 10. The transmission signal is reflected at the target, and the reflected signal is received by the receiving antennas 1-1 through 1-n as receiving signals. In this case, it is assumed that there is a single target to be detected.

In FIG. 2A, a vertical direction indicates frequency, and a lateral direction indicates time. FIG. 2A shows a time difference between a transmission signal and a receiving signal. The receiving signal indicates a time delay compared to the transmission signal, in which the receiving signal is indicated on the right side (time-delay direction) of the transmission signal. It is also shown that there is a difference between frequencies of the transmission signal and the receiving signal. The frequency of the received signal is varied in the vertical axis (frequency direction), depending on a relative velocity of the target to the electronic scanning radar apparatus.

Further, beat signals are obtained for an ascent and a descent of the transmission signal and the received signal, as indicated on down side of FIG. 2A. Hereafter, the ascent may be referred to as an ascending region, and the descent may be referred to as a descending region. After a frequency transformation such as a Fourier transformation, a discrete cosine transform (DCT), a Hadamard transformation, a wavelet transformation or the like is made for the beat signals, two signal peaks are obtained for the ascent region and the descent region, respectively, as shown in FIG. 2B.

In the figure, a vertical axis indicates signal levels (signal intensities), and a lateral direction indicates frequencies. It is assumed that a single target is to be detected.

The data of the beat signals are sampled by synchronizing with the sampling signals. The frequency divider 22 performs frequency resolution for data of the beat signals stored in the memory 21. The frequency resolution may be performed by a Fourier transformation or the like to convert the data into frequencies for discrete time. The frequency resolution is performed for the data for the triangular wave at the ascent (ascending region) and the descent (descending region), respectively. Namely, the frequency divider 22 performs frequency resolution for the beat signals to obtain beat frequencies having a predetermined frequency bandwidth. Then, the frequency divider 22 calculates complex number data based on the beat signals which are resolved as a function of the beat frequencies. The complex number data may be referred to as complex number data, or a data set of complex number.

As a result, the signal levels can be obtained for each of the beat frequencies at the ascent and the descent of the triangular wave (FIG. 2A), as shown in FIG. 2B. The peak detector 23 detects signal peaks of the signal levels for the beat frequencies as indicated in FIG. 2B, and detects whether the target exists or not. Further, the peak detector 23 transmits the beat frequencies of the signal peaks for the ascent and the descent to the peak combination unit 24 as target frequencies.

The distance detection unit 25 receives a target frequency fu at the ascent and a target frequency fd at the descent from the peak combination unit 24. After receiving the target frequency fu and the target frequency fd from the peak combination unit 24, the distance detection unit 25 calculates the distance to the target from the radar apparatus based on the following equation, $$r = \{C \cdot T/2 \cdot \Delta f\} \cdot \{(fu+fd)/2\} \tag{1}$$

where
  C: speed of light
  Δf: modulation frequency bandwidth of a triangular wave
  T: modulation time for an ascent or a descent (See FIG. 2A)
  fu: target frequency at the ascent
  fd: target frequency at the descent.

After receiving the target frequency fu and the target frequency fd from the peak combination unit 24, the velocity detection unit 26 calculates the relative velocity v using the equation below, $$v = \{C/2 \cdot f0\} \cdot \{(fu-fd)/2\} \tag{2}$$

where
  f0: center frequency of a triangular wave.

In the following, there will be described about the receiving antennas 1-1 through 1-n.

Figure 3:
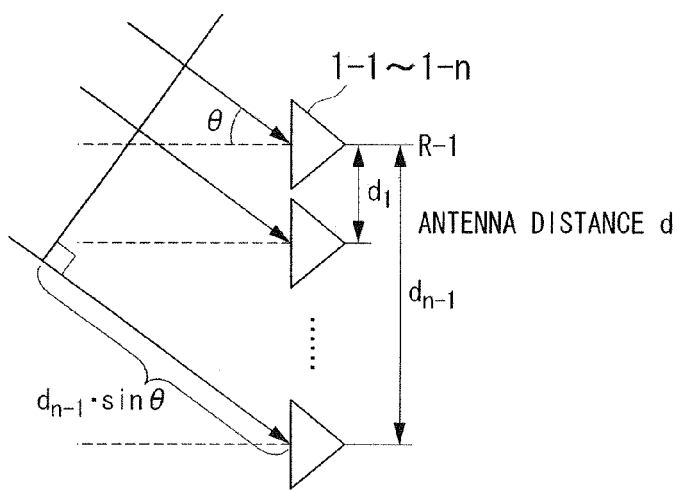
FIG. 3 is a view of array antennas showing how waves are received by the antennas.

FIG. 3 is a view of array antennas showing how waves are received by the antennas 1-1 through 1-n.

The receiving antennas 1-1 through 1-n are provided with an arrayed structure having an antenna distance d as shown in FIG. 3.

The receiving antennas 1-1 through 1-n receive incoming waves from the target. The incoming waves may be referred to as receiving waves, and also the incoming waves are referred to as incident waves. The incoming waves are reflection waves, which are formed by the transmission waves from the transmission antenna 3 being reflected at the target. The reflection waves are received by the receiving antennas 1-1 through 1-n at an angle θ. The angle θ is the angle between an incident angle of the reflection waves and a direction normal to the surface of the arraigned antennas.

The incoming waves are received by the receiving antennas 1-1 through 1-n at the same angle θ.

A phase difference occurs between each of neighboring receiving antennas 1-1 through 1-n for an angle θ and an antenna distance d as indicated in FIG. 3.

The antenna distance is measured from a reference position R-1. In this figure, the position of the antenna 1-1 is assigned as the reference position R-1 as an example. The phase difference is expressed by "dn−1·sin θ" for the given angle θ and the given distance d between neighboring antennas.

The phase difference can be used to detect the angle θ by signal processing. The incoming (receiving) waves are received by the receiving antennas as receiving signals. The signal processing is carried out using such a digital beam forming (DBF) process (method), a high resolution algorithm or the like. Data for the signal processing are obtained by performing the frequency resolution for each of the signals of the receiving antennas 1-1 through 1-n in the time direction. The DBF method applies Fourier transformation to the obtained data in each direction of the antennas.
(Operation of Processing Unit 20 for Receiving Wave)

The memory 21 stores signal data in the wave storing area of the memory. The signal data are obtained with the receiving antennas 1-1 through 1-n by the ADC7. The data are formed with the receiving signals that are converted by A/D conversion in time order (for the ascent and descent).

For example, when the data sampling is performed to collect 256 data sets for the ascent and the descent respectively, the data sets to be collected will become a number of 2×256×n in total, where n indicates the number of the antennas 1-1 through 1-n. Then, the total number of the data sets is stored in the waveform store area of the memory 21.

The frequency divider 22 converts individual beat signals of the antennas 1-1 through 1-n into frequency components by signal conversion with a predetermined resolution. Then the frequency divider 22 outputs the frequency points of the beat frequencies and the complex number data of the beat frequencies. The frequency divider 22 generates the frequency points with those complex number data for respective frequency points. The beat signals individually correspond to channels Ch-1 through Ch-n of the antennas 1-1 through 1-n. Fourier transformation or the like may be used for the signal conversion. For example, when 256 data sets are stored in the memory 21 by performing the data sampling for the ascent and descent for each antenna, the 256 data sets consist of 128 complex number data for the ascent and 128 complex number data for the descent. In this case, the sampled data are converted into beat frequencies indicated as the complex number data of frequency data. The number of the data sets for the whole antennas in total becomes "2×128×N (N: number of the antennas)."

Further, the beat frequencies are expressed by the frequency points. In this case, the complex number data of each antenna include a phase difference according to the angle θ. Each of the complex number data indicates an equivalent absolute value in Gaussian plane, in which the equivalent absolute value corresponds to receiving signal intensity or amplitude.

The individual intensities (or amplitudes or the like) correspond to data sets of the ascent and the descent of the triangular waves. A data set is expressed by the complex number data, so that signal intensity is obtained from the complex number data of the data set. The complex number data are calculated based on the frequency conversion of the beat signals of the triangular waves. The peak detector 23 detects the beat frequencies having peak values greater than a predetermined value. Thereby, the peak detector 23 selects the target frequency by detecting the existence of the target for respective beat frequencies. The peak values may be referred to as peak signal levels.

Therefore, the peak detector 23 forms a frequency spectrum from the complex number data of any of the antennas or forms the frequency spectrum from the whole addition of the complex number data of the whole antennas. Thereby, the peak detector 23 can detect the existence of targets based on the individual peak values of the spectrum. In other words, the peak values are regarded as the existence of the targets depending on a function of distance, since the distance is obtained from the beat frequencies. Further, adding the total complex number data for the whole antennas enables to average noise components, so that the S/N ratio can be improved.

Figure 4A:
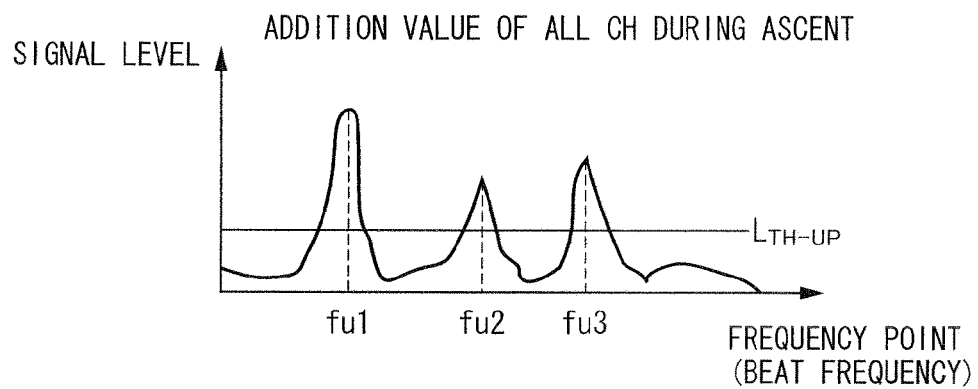
FIG. 4A and FIG. 4B are frequency analysis results showing relationships between the signal levels (vertical axis) of beat signals and the beat frequencies (horizontal axis) for an ascent (ascending region) and a descent (descending region), respectively.
Figure 4B:
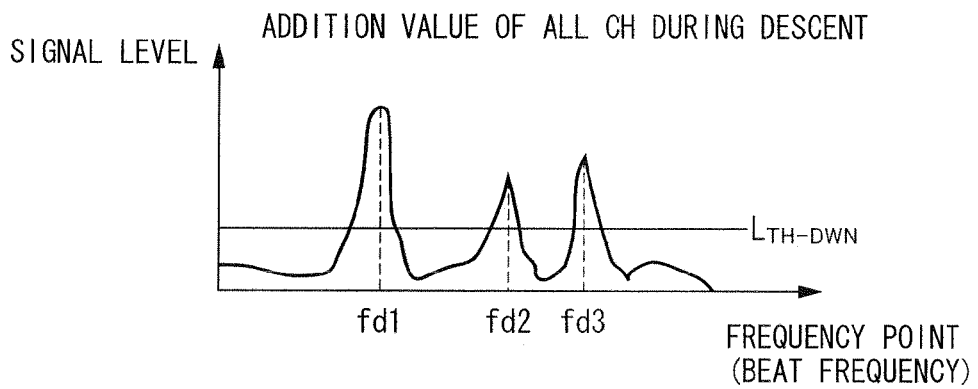

The beat frequencies (frequency points) and their peak values are indicated in FIG. 4A and FIG. 4B. FIG. 4A and FIG. 4B are frequency analysis results showing relationships between the signal levels (vertical axis) of beat signals and the beat frequencies (horizontal axis) for the ascent and the descent, respectively. A threshold level for detecting peaks at the ascent is indicated as Lth-up. Another threshold level for detecting peaks at the descent is indicated as Lth-dwn.

The peak combination unit 24 receives the beat frequencies and their peak values from the peak detector 23. The peak combination unit 24 combines the beat frequencies and their peak values at the ascent and the descent in the manner of a matrix. The matrix is formed to make a round robin combination with respect to the beat frequencies and their peak values received from the peak detector 23. Namely, the individual beat frequencies of the ascent and the descent are all combined, and sequentially transmitted to the distance detection unit 25 and the velocity detection unit 26. The distance detection unit 25 sequentially receives the beat frequencies for the ascent and the descent from the peak combination unit 24. Numerical values are obtained by adding each of the beat frequencies for the ascent and the descent. The distance detection unit 25 calculates the distance r of a target from the numerical values.

Further, the velocity detection unit 26 calculates a relative velocity between the target and the electronic scanning radar apparatus. The relative velocity is obtained from a frequency difference between the beat frequencies for the ascent and descent, which are sequentially received from the peak combination unit 24.

FIG. 5 is an illustration of a matrix of beat frequencies in the ascent and the descent at a peak combination unit 24 of FIG. 1, showing distances and relative velocities between each of the targets and the electronic scanning radar apparatus obtained by combining the beat frequencies at the ascent and the descent. The peak corresponding unit 27 forms a table consisting of the distance r, the relative velocity v, the peak levels pu, pd for the ascent and descent, as shown in FIG. 5. The peaks for the ascent correspond to a row direction (lateral direction), and the peaks for the descent correspond to a column direction (vertical direction). After performing the DBF method, the data table (matrix) is generated for a number of channels. The peak corresponding unit 27 determines the appropriate pair of peaks for the ascent and descent of each target.

The peak corresponding unit 27 determines the pair of peaks at the ascent and descent, and generates a data table as shown in FIG. 6. Further, the peak corresponding unit 27 determines and arranges the distances, and the relative velocities, by sorting grouped target numbers. Then the peak corresponding unit 27 transmits the grouped target numbers to a frequency resolution processing unit 22. FIG. 6 illustrates a data table that stores distances and relative velocities and frequency points of the ascent and the descent according to the target group numbers. The tables shown in FIG. 5 and FIG. 6 are stored in an internal memory part of the peak corresponding unit 27. In this case, since the direction has not been determined for each target group, a position in a lateral direction parallel to the arranged direction of the receiving antennas 1-1 through 1-n is not determined for a perpendicular axis that is perpendicular to the arranged direction of the antenna array of the electric scanning radar apparatus.

For example, the peak corresponding unit 27 may use a method that selects combinations of the target groups by taking priority over a value predicted in the present detecting cycle based on the distance r from each target and the relative velocity v finally determined in the previous detecting cycle.

The direction estimating unit 30 performs a spectral estimation process using a high resolution algorithm such as the AR spectral estimation process or the MUSIC method. The direction estimating unit 30 detects the direction of a target based on the present spectra estimation and transmits the direction of the target.

In the following, for a spectral estimation there will be specifically described about a specific example of a procedure of an AR spectral estimation process which is known as the high resolution algorism.

In the direction estimating unit 30, a normal equation generation unit 301 generates normal equations which are necessary for the AR spectral estimation.

The normal equation generation unit 301 forms a correlation matrix obtained from the complex number data according to the beat frequencies for the ascent or the descent, or the beat frequencies for both the ascent and the descent, where the beat frequencies are obtained in terms of the frequency resolution by the frequency divider 22. The normal equation generation unit 301 generates a normal equation based on the obtained correlation matrix. The coefficient calculation unit 302 calculates the AR coefficient obtained from the normal equation generated by the normal equation generation unit 301 and a variance $\sigma^2$ of white noise. In this way, the AR coefficient calculation unit 302 can perform the spectral estimation for every antenna according to detecting cycles based on the complex number data of a beat frequency which indicates the existence of the target has been detected.

The determination unit 303 determines a number of orders based on AR coefficients and variances $\sigma^2$ of white noise, in which the AR coefficients and the variances are obtained from normal equations having different orders. The determination unit 303 transmits the obtained AR coefficients and obtained variances $\sigma^2$ of white noise to the power spectrum calculation unit 304.

The power spectrum calculation unit 304 calculates an incoming direction of the receiving wave (signal) from the power spectrum obtained based upon the AR coefficients and the variances $\sigma^2$ of the white noise.

In the following, it will be described an autoregressive spectral estimation method (AR spectral estimation method) in accordance with the present embodiment.

(Principle of Estimation Process Using AR Model)

Figure 7:
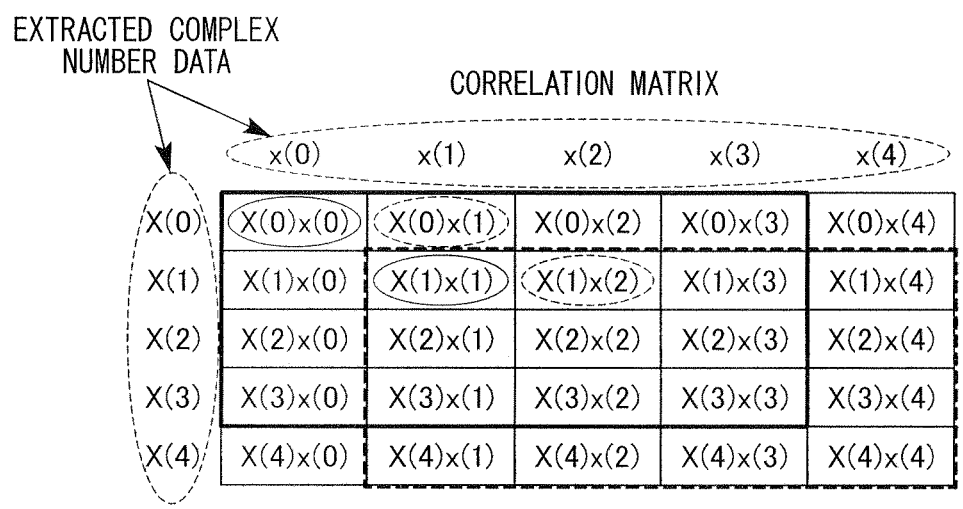
FIG. 7 is a drawing that illustrates extraction of a covariance matrix.

FIG. 7 is a figure which illustrates extraction of a covariance matrix. A table in the figure indicates each element of the correlation matrix the fifth order. This table shows a five by five matrix. The elements of the five by five matrix are led from complex number data. The rows are numbered from 0 to 4, and the columns are numbered from 0 to 4.

For example, an element at the zero-th row X(0) and the zero-th column x(0) of the matrix is expressed as "X(0)x(0)," as indicated on the upper left side of the table.

FIG. 8 is a diagram which indicates a relationship between normal equations and the orders. A first order normal equation, a second order normal equation and a third order normal equation are indicated with respective AR coefficients, right hand side vectors. In FIG. 7, FIG. 8, and equations (3) through (7), symbols "*" of conjugate complex numbers are omitted for simple examinations.

In this example, a description will be given for a case where a third order covariance matrix is extracted from a fifth order correlation matrix that corresponds to five data. The number of matrixes to be divided for a range of extraction of a covariance matrix is obtained by "a number of data-the order of a covariance matrix."

In figures, two ranges are indicated for extractions. The first extraction is made for a range having rows of X(0) through X(2) and columns of x(0) through x(2). The second extraction is made for a range having rows of X(1) through X(3) and columns of x(1) through x(3). When two extraction ranges are overlapped, the elements to be overlapped can be the elements of a covariance matrix.

A normal equation using a covariance matrix is indicated in equation (3).

$$C_M A = -vc, \quad (3)$$

$$C_M = \begin{bmatrix} C_x(1,1) & C_x(1,2) & \cdots & C_x(1,M) \\ C_x(2,1) & C_x(2,2) & \cdots & C_x(2,M) \\ \vdots & \vdots & \ddots & \vdots \\ C_x(M,1) & C_x(M,2) & \cdots & C_x(M,M) \end{bmatrix},$$

$$A = \begin{bmatrix} \hat{a}_M(1) \\ \hat{a}_M(2) \\ \vdots \\ \hat{a}_M(M) \end{bmatrix}, \quad vc = \begin{bmatrix} C_x(1,0) \\ C_x(2,0) \\ \vdots \\ C_x(M,0) \end{bmatrix}$$

In equation (3), the left side expresses a product of the covariance matrix $C_M$ and AR coefficient vector A. The right side is the right hand side vector vc. The elements of the covariance matrix $C_M$ are obtained from equation (4) of a modified covariance function.

Thus, the number of matrixes can be expressed by 2×(the number of data−the order of a covariance matrix). A covariance matrix is composed of the matrixes.

$$C_x(j,k) = \frac{1}{2(N-M)} \left\{ \sum_{n=M}^{N-1} x(n-j)x(n-k) + \sum_{n=0}^{N-1-M} x(n+j)x(n+k) \right\} \quad (4)$$

$$k, j = 0, 1, \ldots, M$$

In equation (4), M indicates the order of the AR model, N and L indicate the number of data, and x(t) indicates input data.

In this case, the input data x(t) is the complex number data of a beat frequency corresponding to a frequency point.

The elements of the right hand side vector vc can be led from equation (5).

$$C_x(j,k) = \frac{1}{2(N-M)} \left\{ \sum_{n=M}^{N-1} x(n-j)x(n-k) + \sum_{n=0}^{N-1-M} x(n+j)x(n+k) \right\} \quad (5)$$

$$k = 0, \quad j = 0, 1, \ldots, M$$

Further, a variance $\sigma^2$ of white noise is written by equation (6).

$$\hat{\sigma}v^2 = Cx(0,0) + \sum_{n=1}^{M} \hat{a}_M(k) Cx(0,k) \quad (6)$$

The AR coefficient can be obtained by solving the normal equation using a general solution.

In a linear estimation of the AR method, the normal equation is obtained under a condition in which the averaged square error of a difference between a predicted value and an observed value becomes the minimum.

The AR coefficient can be obtained by solving the normal equation based on a general solution.

The modified covariance method in accordance with the present embodiment can apply the input data for a backward direction as well as for a forward direction, so that the number of data to be used is virtually increased compared to the general covariance method which uses input data for the forward direction. The modified covariance method is substantially the same as the general covariance method.

The general covariance method can be applied by replacing equations (4) and (5) of the modified covariance function into equation (7) of the general covariance method.

$$Cx(j, k) = \frac{1}{N-M} \sum_{n=M}^{N-1} x(n-j)x(n-k) \quad (7)$$

$$k, j = 0, 1, \ldots, M$$

In the following, descriptions will be given for the AR spectral estimation method based on the modified covariance method based on the third order. For example, when the AR spectral estimation method is applied under a condition of the third order, it basically allows for detecting a maximum of three targets which are all existing at the same distance from a radar apparatus.

FIG. 8 is a diagram which indicates a relationship between normal equations and the model's order.

The normal equation is written as a linear equation which is composed of a covariance matrix, an AR coefficient vector and a right hand side vector. For modeling, the order of normal equation should be modified according to the order of a model.

AR coefficients are parameters, in which the number of elements of the AR coefficients increases with the order to be used.

FIG. 8 indicates the first, second and third order of normal equations. A covariance matrix, an AR coefficient and a right hand side vector of each of the first, second and third order of normal equations are indicted in the figure.

The covariance matrixes, elements of the AR coefficient vectors, $\hat{a}_M(*)$, and elements of the right hand side vectors, $C_{xM}(*,*)$ are complex numbers. The number of incoming waves and their angles can be detected from a peak position of a power spectrum which is obtained by solving AR coefficients with the determined order.

The AR coefficients are obtained by solving the normal equation.

FIG. 9 is a diagram which indicates a relationship between the orders of AR coefficients and the number of targets (the number of receiving waves).

In the table, the row indicates a number of targets to be input into each of the first, second and third order normal equations.

The order of normal equation increases from first to third with increases in the number of targets from a single (corresponding to a single receiving wave) to three (corresponding to three receiving waves). The row of the table indicates elements of AR coefficients as a(1), a(2) and a(3). For a first order normal equation, the number of elements of AR coefficients becomes one, so that only an element a(1) is used. For a third order normal equation, the number of elements of AR coefficients becomes three, so that three elements, a(1), a(2) and a(3) are used.

The table of FIG. 9 also shows the amplitudes of AR coefficients indicated by the relationship between the orders of normal equations and the elements of AR coefficients. In this case, the number of amplitudes of AR coefficients depends on the number of targets (the number of receiving waves).

As AR coefficients are complex numbers, amplitude of an AR coefficient (an absolute value of complex number) is calculated from a real part and an imaginary part of the AR coefficient. According to the array antenna theory, a combined wave having a complex sine wave can be formed when the array antennas receive incoming waves in ideal conditions. In some cases, the amplitude of an AR coefficient becomes 1 and stable when a suitable number of receiving waves and a suitable element of the AR coefficient are chosen.

In the table, the stable conditions, in which the amplitude of AR coefficients becomes 1 and stable, are indicated by "≈1."

A condition providing a unity amplitude can be expressed as a point on the circumference of a unit circle in the complex plane. According to the table, more specific conditions providing a unity amplitude of AR coefficient are a(1) corresponding to the first order for a single target, a(2) corresponding to the second order for two targets, and a(3) corresponding to the third order for three targets.

By utilizing these characteristics, the number of receiving waves can be estimated based on the obtained amplitude of AR coefficients. Namely, the amplitudes of obtained AR coefficients are compared, so that the number of targets (the number of receiving waves) is led based on a classifying (distinguishing) method based on three category patterns.

FIG. 10 is a diagram illustrated based on the table of FIG. 9. For a single target, the amplitude of AR coefficient indicates the first element (1a(1)) of the first order. For two targets, the amplitudes of AR coefficients indicates the second element (2a(2)) of the second order. For three targets, the amplitudes of AR coefficients indicates the third element (3a(3)) of the third order.

The first pattern (pattern 1) indicates a single target (single receiving wave), in which the first element (1a(1)) of the first order becomes unity.

In this case, the second element (2a(2)) of the second order and the third element (3a(3)) of the third order are less than unity. In other words, it is a preferable condition in which the determination is made based on the first element (1a(1)) of the first order. For the second pattern (pattern 2) indicating existence of two targets (two receiving waves), the amplitude of the second element (2a(2)) of the second order becomes unity. On the other hand, the first element (1a(a)) of the first order and the third element (3a(3)) of the third order are less than unity.

Namely, for two targets (two receiving waves), it is a preferable condition in which the determination is made based on the second element (2a(2)) of the second order.

For the third pattern (pattern 3) indicating existence of three targets (three receiving waves), the amplitude of the third element (3a(3)) of the third order becomes unity. On the other hand, the first element (1a(a)) of the first order and the second element (2a(2)) of the second order are less than unity. Namely, for three targets (three receiving waves), it is a preferable condition in which the determination is made based on the three element (3a(3)) of the third order.

The number of targets (the number of receiving waves) can be obtained by classification based on the characterized patterns before the calculations of the power spectrum based on the AR confidents and the solution are made.

Practically, the estimations of the AR modeling can become inaccurate because of actual conditions. For example, when the receiving waves arrive from the similar directions, the angles formed by the waves become narrow. When the angles formed by the receiving waves become narrower, it becomes difficult to detect each peak of the receiving waves, so that ideal measurements cannot be obtained. In such a case, FIGS. 9 and 10 are used as basic relations, and the determination logic and a threshold value are provided for performing practical determination according to the actual circumstances.

In the present embodiment, an example will be described for a case where a single target is to be detected. When detecting a single target, the electronic scanning radar apparatus sets the order of the normal equation to be second (or first) to reduce an error peak. In fact, this can be practical, since the first element (1a(1)=1) of the first order tends to be stable in actual circumstances. When the order of the normal equation is set to be second, the electronic scanning radar apparatus is able not only to detect one target (FIG. 16) but also to be able to detect two targets by distinguishing them.

Figure 11A:
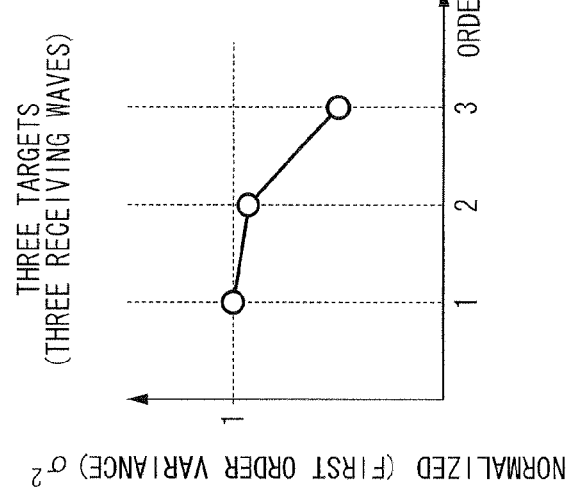
FIGS. 11A, 11B and 11C are diagrams which show relationships between the order of equation and the number of targets (the number of receiving waves) in the variances of white noise.
Figure 11B:
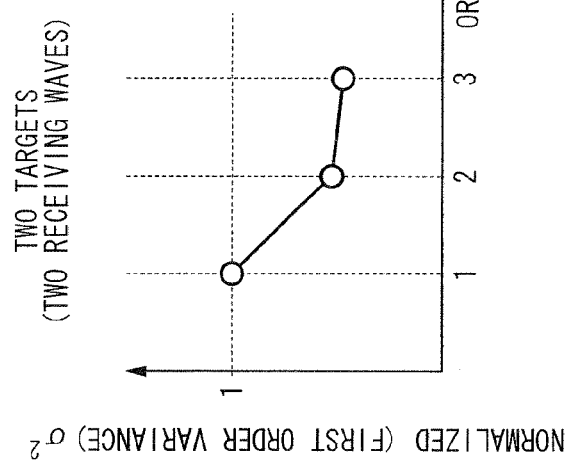
Figure 11C:
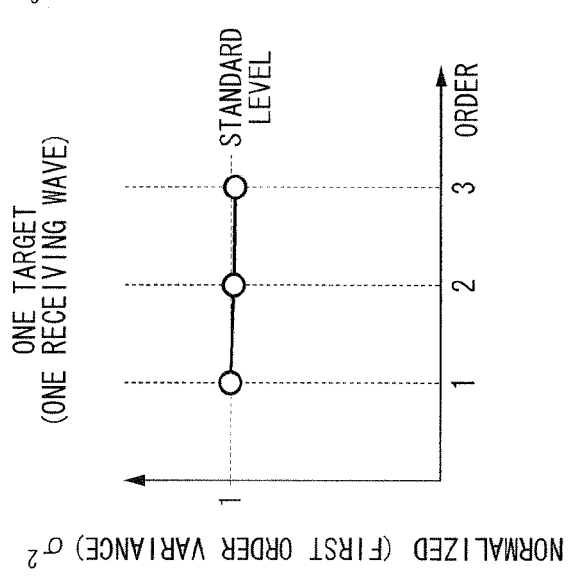

FIGS. 11A, 11B and 11C are diagrams that show relationships between the orders of normal equations and the number of targets (the number of receiving waves) in the variance of white noise.

In the modified covariance method (improved variance method), the variance of white noise is led from equation (6) based on the obtained AR coefficients.

Further, the variance of white noise can be led based on other methods without using equation (6). For example, the Yule-Walker method and the Burg method can obtain both the variance of white noise and AR coefficients at the same time.

As shown in FIGS. 11A, 11B and 11C, when normalized by the first order variance of white noise, the amplitudes of AR coefficients indicate patterns 1 to pattern 3 depending on the number of receiving waves.

The first pattern, indicating a single target (a single receiving wave), shows that the variances of the first, second and third orders have similar values.

Namely, the radar apparatus can detect the target with small estimation errors for the first, second and third orders. In other words, it is found that the radar apparatus detects effective white noises for the first, second and third orders.

The second pattern, indicating two targets (two receiving waves), shows that the variances of the second and third orders are smaller value than that of the first order. This indicates that the first order variance of white noise is large, meaning that the estimation error the first order is greater than those of the second and third orders of white noise. It is found that effective values of white noise are detected for the second and third order variances.

The third pattern, indicating three targets (three receiving waves), shows that the variance of the third order is smaller than those of the first order and second order. The first order variance and the second order variance show similar values.

The variances of the first and second orders of white noise are greater than that of the third order, meaning that the estimation errors of the first and second orders are greater than that of the third order. An effective value of white noise is detected for the third order. By normalizing the variances of white noise, the variation factors of absolute values due to RCS (radar cross section) of targets or clutter can be excluded. With this method, it becomes possible to perform relative comparison of detected values, unlike the case of the comparison of absolute values. Furthermore, the variance of white noise can be influenced by conditions of actual circumstances, so that the accuracy of estimations based on the AR model can be degraded. For this, proper threshold values are used to adjust for the actual circumstances.

Figure 12A:
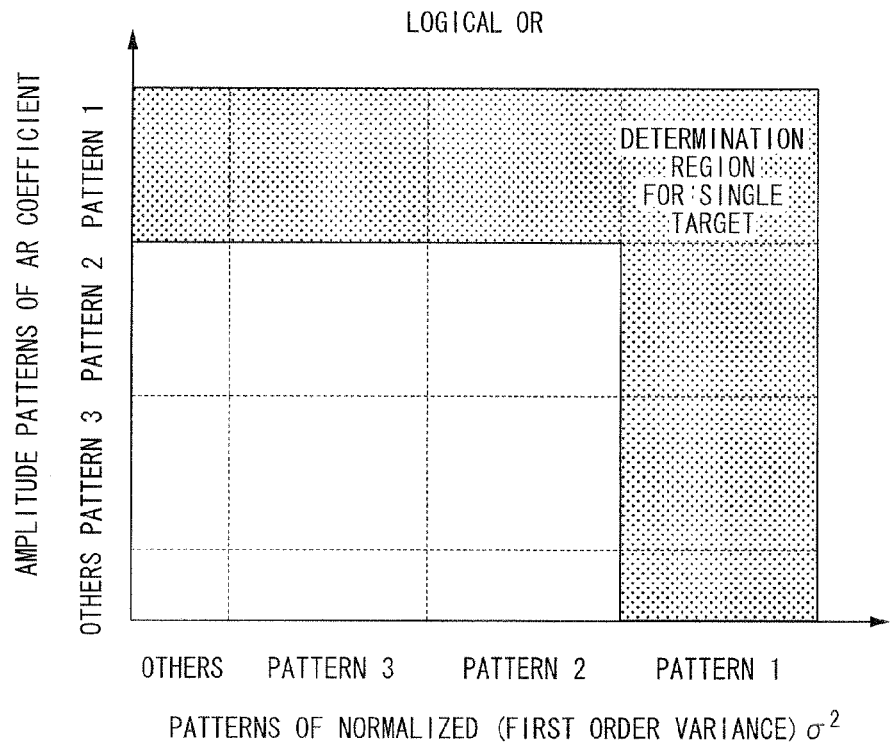
FIGS. 12A and 12B are diagrams which show amplitude patterns AR coefficients and patterns of normalized variances $\sigma^2$.
Figure 12B:
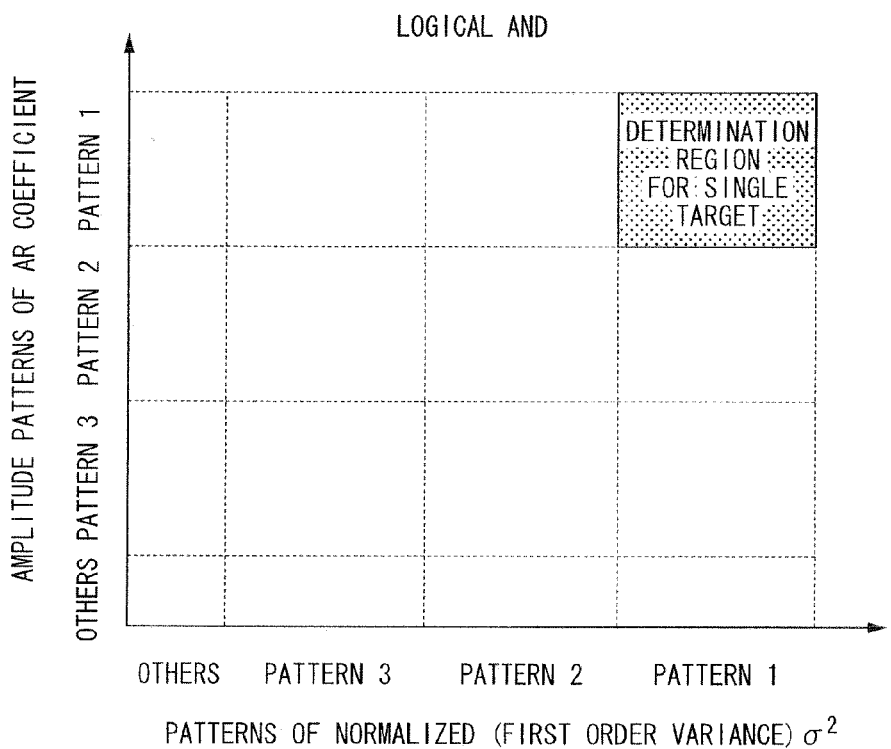

FIGS. 12A and 12B are diagrams which show determination conditions of the number of targets.

The diagrams of the figures indicate determination conditions for detecting a single target. There are separated regions in the diagrams. The separated regions, indicating characterized spatial coordinates, are formed based on the combinations between the patterns of the amplitudes of AR coefficients and the variances of white noise.

FIG. 12A indicates that a single target is classified by a condition which is determined based on the logical sum (logical OR) between the pattern 1 (pattern first) of the amplitudes of AR coefficients and the variances of white noise.

FIG. 12B indicates that a single target is classified by a condition which is determined based on the logical product (logical AND) between the pattern 1 (pattern first) of the amplitudes of AR coefficients and the variances of white noise.

The determination condition of the single target can be obtained by arithmetic operations based on the logical sum or the logical product. Namely, the single target can be determined by combinations of signal elements (amplitudes of AR coefficients) and noise elements (variances of normalized white noise) according to a determination condition of either the logical sum or the logical product.

Figure 13A:
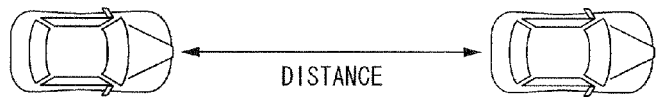
FIG. 13A is a view which schematically illustrates positions of two moving bodies.
Figure 13B:
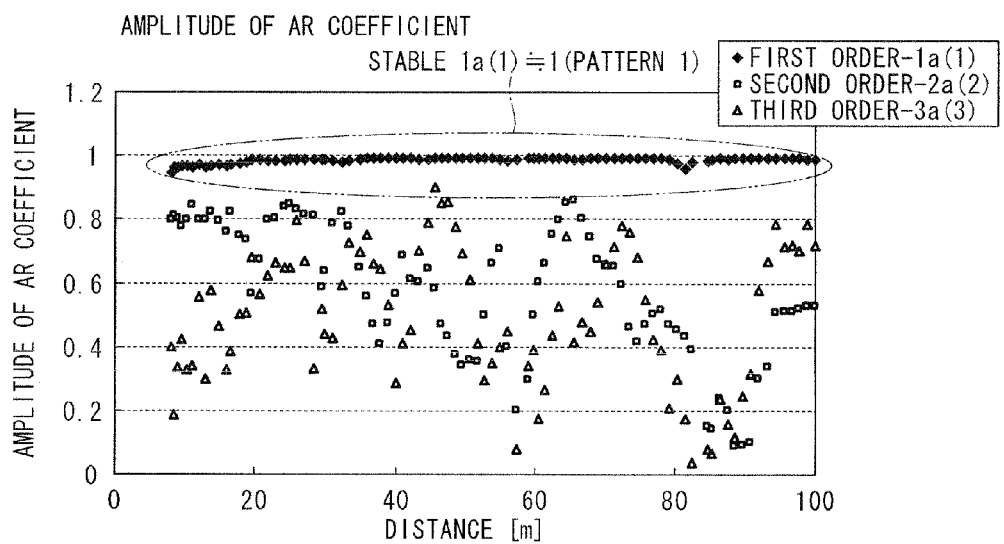
FIG. 13B is a diagram which indicates a relationship between the amplitudes of AR coefficients and distances.
Figure 13C:
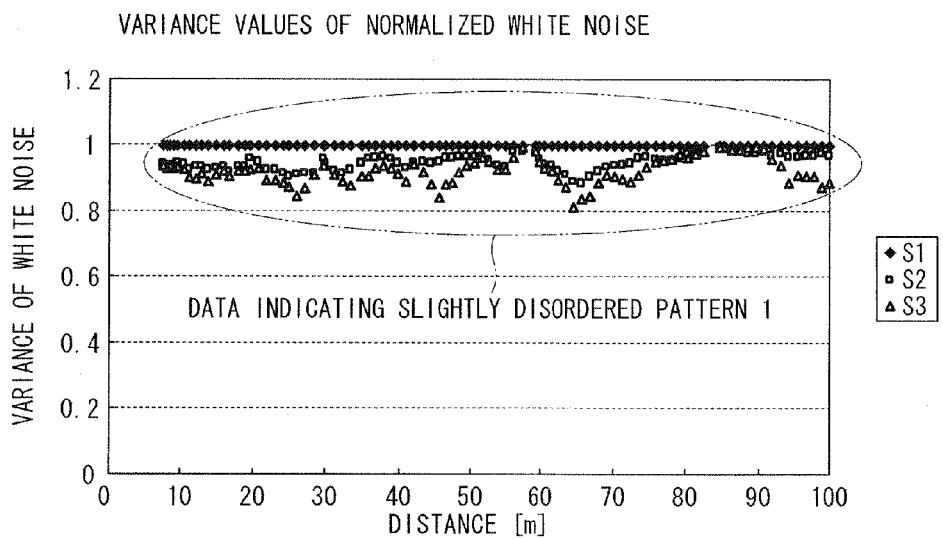
FIG. 13C is a diagram which indicates a relationship between variances of white noise and distances of the two moving bodies.

FIGS. 13A, 13B and 13C are diagrams for describing on the parameters of the amplitudes of AR coefficients and the variances of white noise affected (influenced) from distances between a target (a moving body or a car) and another moving body (a measuring car mounting a radar apparatus).

FIGS. 13B and 13C indicate examples of the amplitudes of AR coefficients and the variances of white noise obtained by measuring data under actual circumstances for the distances between a target and a radar apparatus. These figures indicate the influence on the distances to the amplitudes of AR coefficients and the variances of white noise obtained.

FIG. 13A is a view which schematically illustrates the target and the measuring car, in which the target is in front of the measuring car with a predetermined position. The distances are determined by the separations between the target and the measuring car.

FIG. 13B is a diagram which indicates a relationship between the amplitudes of AR coefficients and distances of the two moving bodies (the target and the measuring car). The vertical axis corresponds to the amplitudes of AR coefficients. The lateral axis indicates to the distances from the measuring car to the target.

FIG. 13C is a diagram which indicates a relationship between the variances of white noise and the distances between the target and the measuring car. The vertical axis corresponds to the variances of white noise. The lateral axis indicates to the distances from the measuring car to the target. In other words, the data sets show the measurements made for a target care located in front of the measuring car with a predetermined position (distance).

In FIG. 13B where the first order ($1a(1)$) is set, the amplitudes of AR coefficients converge on unity. On the other hand, the second order ($2a(2)$) or the third order ($3a(3)$) are set, the amplitudes of AR coefficients vary depending on the distances, indicating unstable values. It clearly shows the pattern 1 (the first pattern) indicating a single target (a single receiving wave) according to the theory.

In FIG. 13C where the first order (S1) is set, the variances of white noise converge on unity. On the other hand, the second order ($2a(2)$) or the third order ($3a(3)$) are set, the variances of white noise vary depending on the distances, slightly decreasing from unity.

Therefore, when taking into considerations of the actual circumstances or the different reflection conditions of receiving waves from each of cars (targets), the determination accuracy can be improved by complementary determining based on two parameters (the amplitudes of AR coefficients and the variances of white noise).

(Procedure of Estimating Incoming Direction of Receiving Wave)

It will be described a procedure for estimating a coming direction of a receiving wave by the direction estimating unit 30. As an example, a description is made for an AR spectral estimation procedure which uses a high resolution algorism based on a modified covariance method. The covariance method can be used instead of the modified covariance method.

The fundamental procedure of the modified covariance method is the same as that of the covariance method.

The AR spectral estimation process is generally described in such as "MATLAB Multi-media Signal Processing part I: Digital signal fundamentals" published by Ikehara and Shimamura in 2004 by BAIFUKAN CO., LTD. For the AR spectral estimation process, explanations will be focused on only parts which are necessary for describing the present embodiment.

Figure 14:
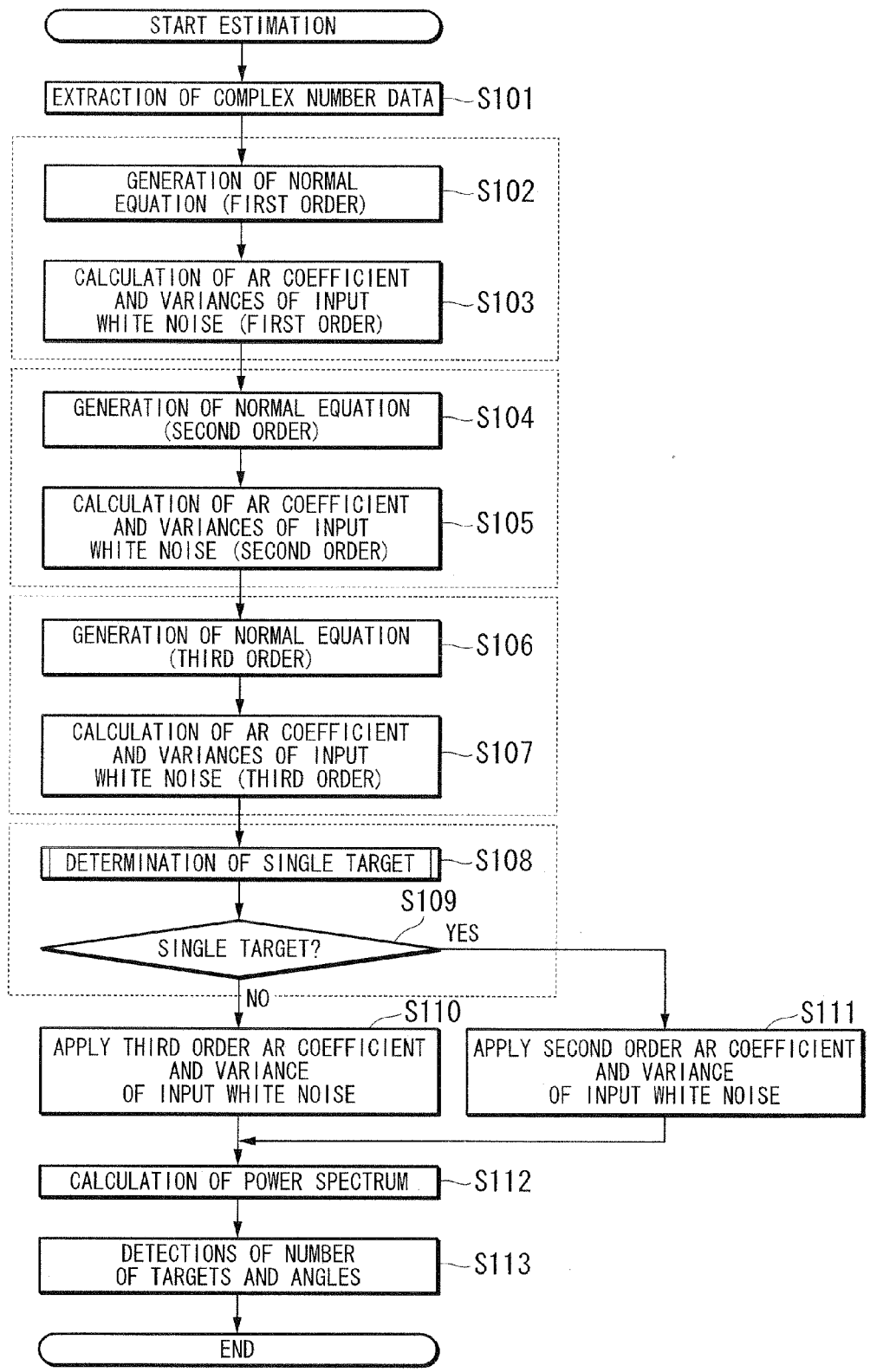
FIG. 14 is a flowchart illustrating data processing of a target direction estimation process of the electronic scanning radar apparatus.

FIG. 14 is a flowchart illustrating data processing of a target direction estimation process in the electronic scanning radar apparatus. The data processing according to the flowchart in the figure is performed periodically and repeatedly.

The frequency divider 22 extracts complex number data by using frequency resolution. The complex number data correspond to distance points of the target (reflection object) obtained in step S101.

The normal equation generation unit 301 of the direction estimating unit 30 obtains a correlation matrix based on the complex number data. The normal equation generation unit 301 generates a first order covariance matrix and a first order right hand side vector from the correlation matrix, and makes them be complex number elements of a first order normal equation in step S102.

The AR coefficient calculation unit 302 solves the first order normal equation and obtains a first order AR coefficient. For a technique for solving the normal equation, a high speed algorism such as Cholesky decomposition or the like, which solves an inverse matrix at a high speed, can be used. Further, the AR coefficient calculation unit 302 calculates a variance $\sigma^2$ of a first order white noise in step S103.

The normal equation generation unit 301 of the direction estimating unit 30 generates a second order covariance matrix from the correlation matrix as an element of the second order normal equation (step S104).

The AR coefficient calculation unit 302 solves the second order normal equation and obtains a second order AR coefficient.

Furthermore, the AR coefficient calculation unit 302 also calculates a variance $\sigma^2$ of a second order white noise to be input (step S105).

The normal equation generation unit 301 of the direction estimating unit 30 generates a third order covariance matrix and a third order right hand side vector from the correlation matrix as elements of the third order normal equation (step S106). The AR coefficient calculation unit 302 solves the third normal equation and obtain a third AR coefficient.

Furthermore, the AR coefficient calculation unit 302 also calculates a variance $\sigma^2$ of a third order white noise to be input (step S107).

The AR coefficient filter unit 303 determines whether the number of target is a single (one) or not (step S108) based on the first, second and third order AR coefficients and the variances $\sigma^2$ of white noise calculated in steps S102 through S107.

When the AR coefficient filter unit 303 determines the number of targets not to be a single as a result of determination step S108, the data processing in step S110 is advanced to the step S110. When the number of targets is a single as a result of determination step S108, the data processing is advanced to the step S111 (step S109).

When the number of targets is determined not to be a single as a result of determination step S109, the AR coefficient filter unit 303 chooses the third order AR coefficient and the variance $\sigma^2$ of white noise, and advances the data processing to the step S112 (step 110).

The AR coefficient filter unit 303 chooses the second order AR coefficient and the variance $\sigma^2$ of white noise based on the result of step S109 in which the number of targets is determined not to be a single.

Subsequently, the power spectrum calculation unit 304 calculates a power spectrum.

The power spectrum is obtained based on the AR coefficient and the variance $\sigma^2$ of white noise. The obtained power spectrum indicates the transfer characteristics of the incoming wave. A peak characteristic is detected from the obtained power spectrum, which corresponds to a pole of a transfer function (step S112), in which the transfer characteristics are expressed by the transfer function.

An angle indicated by the peak is detected as an incoming angle (arriving angle) of the reflection wave (step S113).

As described above, the AR coefficients relate to an obtained power spectrum and contribute an accuracy of peak shapes of the power spectrum. Thus, the estimation accuracy of the AR coefficients improves with the detecting performance (performances of detecting angles and angle separation).

Figure 15:
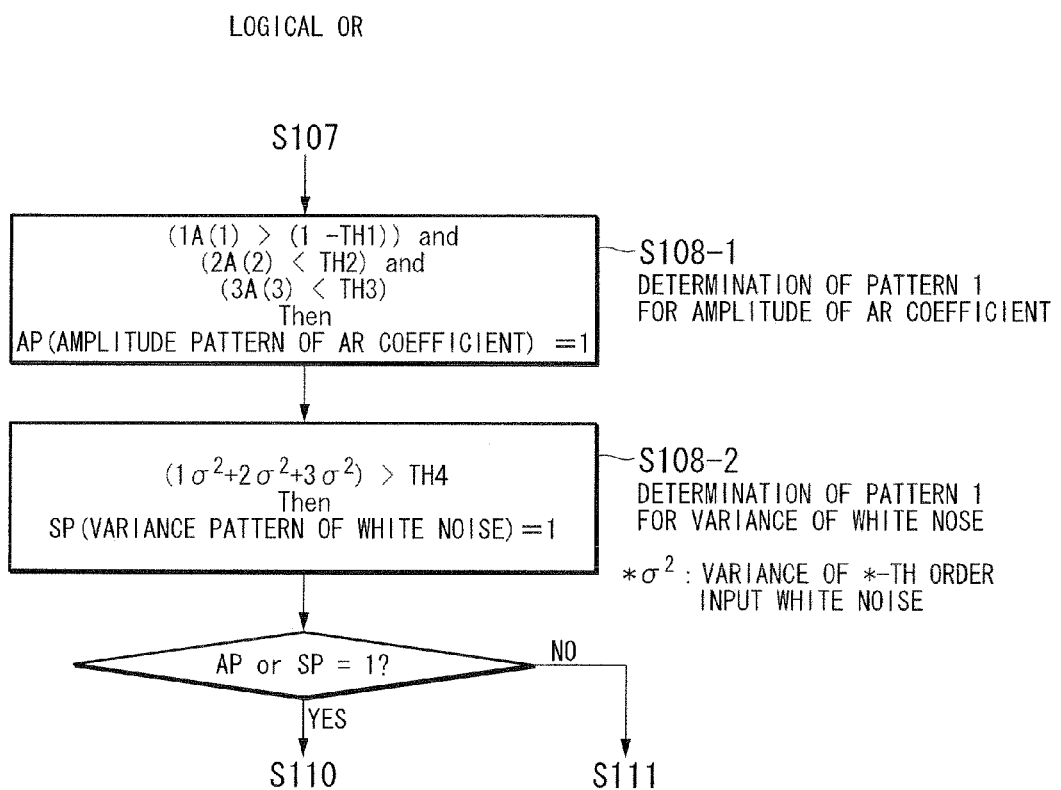
FIG. 15 is a flowchart which indicates a determination process in which a pattern 1 is determined based on two parameters.

FIG. 15 is a flowchart indicating logical processes that form pattern 1 based on two parameters. This is an embodiment, which is a determination process in steps S108 and S109 shown in FIG. 14.

For determining pattern 1 (a single receiving wave) based on the amplitudes of AR coefficients, the following three logical products are used as the conditions.

The first condition is a case in which the first order amplitude of the first element (1a(1)) is greater than (1-TH1). TH1 is a first threshold value which is a predetermined to determine the first order amplitude of the first element (1a(1)).

The second condition is a case in which the second order amplitude of the second element (2a(2)) is less than (TH2). TH2 is a second threshold value which is predetermined to determine the second order amplitude of the second element (2a(2)). The third condition is a case in which the third order amplitude of the third element (3a(3)) is less than (TH3).

TH3 is a third threshold value which is predetermined to determine the third order amplitude of the third element (3a(3)).

When the three conditions are all satisfied, a flag of the amplitude pattern of AR coefficient (AP) is set to "1" (step S108-1). Also, for achieving higher determination, it is possible to determine based on whether 1a(1), 2a(2) and 3a(3) in FIG. 13B are stable or unstable for distances (or time).

For determining pattern 1 (a single receiving wave) based on the variances of white noise, the following three logical products are used as the conditions. When the sum of the first, second and third variance of white noise is greater than (TH4), a flag of the variance pattern of white noise (SP) is set to "1." TH4 is a third threshold value which is predetermined to determine the variance of white noise.

Also, for achieving higher determination, it is possible to determine whether S1, S2 and S3 in FIG. 13C are stable or unstable for distances (or time).

Further determination is made based on the flag of the amplitude pattern of AR coefficient (AP) and the flag of the variance pattern of white noise (SP). It is determined whether the logical sum of the flag of the amplitude pattern of AR coefficient (AP) and the flag of the variance pattern of white noise (SP) becomes "1" or not. When the logical sum indicates "1," it is determined that a number of target is one (a single target), and the process of step S111 is performed.

In this example, although a simple logical operation is used, each value of parameters may be converted to pattern weighted linear value, so that it is possible to introduce determination processes with classifications for achieving higher performance, which is performed based on weighted operations and threshold values.

Figure 16A:
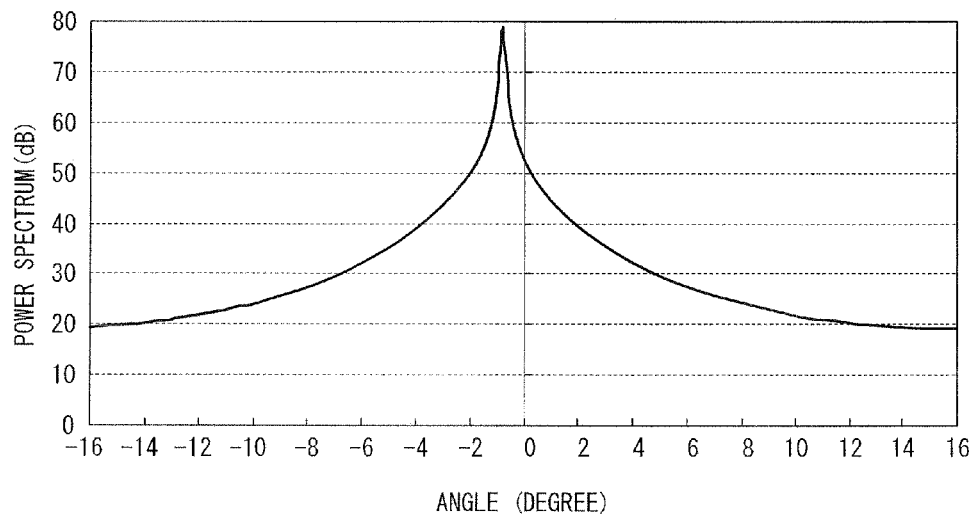
FIG. 16A is a diagram which illustrates an estimated power spectrum as a function of angles, in which the estimation is made based on a second order for a single target.
Figure 16B:
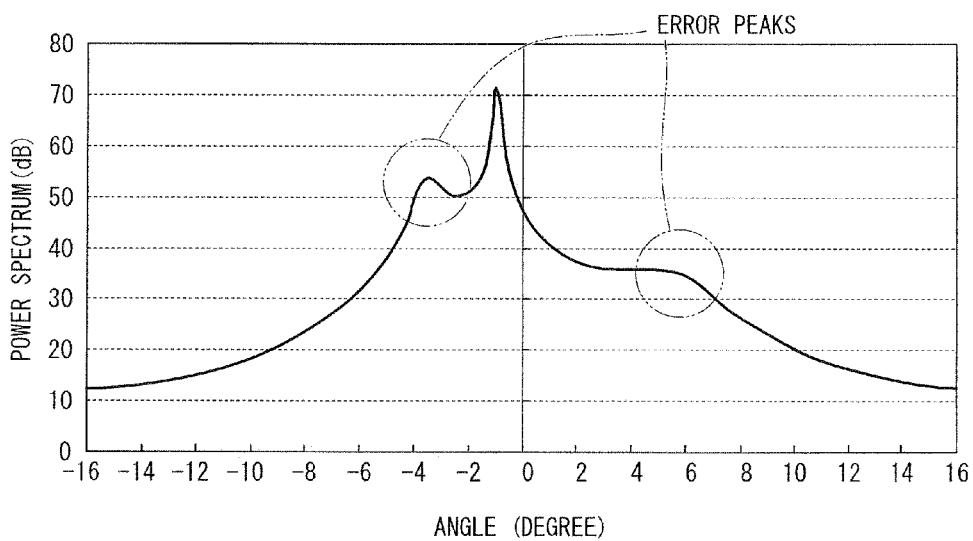
FIG. 16B is a diagram which illustrates an estimated power spectrum as a function of angles, in which the estimation is made based on a third order of a normal equation for a single target.

FIGS. 16A and 16B show examples of the present embodiment.

FIG. 16A is a diagram which illustrates an estimated power spectrum as a function of angles, in which the estimation is made based on a second order for a single target. In this case, no error peak is seen as the single target is correctly detected.

FIG. 16B is a diagram which illustrates an estimated power spectrum as a function of angles, in which the estimation is made based on a third order for a single target. This figure shows two error peaks in the spectrum.

(Second Embodiment)

Next, descriptions will be given for an electronic scanning radar apparatus of the present embodiment with reference to figures.

FIG. 17 is a block diagram of the electronic scanning radar apparatus of the present embodiment.

A signal processing unit 20B of the present embodiment performs direction estimations based on a high resolution algorithm, similar to the case of the first embodiment.

In the following, identical symbols are used for identical configurations used in FIG. 1, and descriptions will be given for different parts from the case of the first embodiment.

In the signal processing unit 20B, a frequency resolution processing unit 22B converts beat signals of an ascending region and a descending region for each antenna into complex number data. The frequency resolution processing unit 22B transmits frequency points and the complex number data to a peak detector 23B, in which the frequency points indicate the beat frequencies of the beat signals.

The peak detector 23B detects peak values of the beat signals for each of the ascending region and the descending region, and seeks the frequency points of the peak values. The peak detector 23B transmits the frequency points to the frequency resolution processing unit 22B. The frequency resolution processing unit 22B transmits complex number data each corresponding to each of the ascending region and the descending region to a direction estimating unit 30B.

The complex number data become target groups for the ascending region and descending region. The target groups correspond to the peak frequencies having peaks for the ascending region and the descending region.

The direction estimating unit 30B estimates the orders based on the complex number data received from the frequency resolution processing unit 22B.

The direction estimating unit 30B detects respective angles θ of AR coefficients for the ascending region and descending region, and transmits the angles θ to a peak combination unit 24B as shown in tables of FIGS. 18A and 18B. FIG. 18A corresponds to a data table obtained for ascending regions. FIG. 18B corresponds to a data table obtained for descending regions.

Furthermore, the peak combination unit 24B performs combinations between data sets which have similar angles, obtaining combinations of frequency points (beat frequencies) for the ascending region and descending region. The peak combination unit 24B transmits the combination of frequency points to the distance detection unit 25 and the velocity detection unit 26.

Similar to the first embodiment, the distance detection unit 25 calculates distances based on the beat frequencies of ascending region and descending region obtained from the combinations.

Also, similar to the first embodiment, the velocity detection unit 26 calculates relative velocities based on the beat frequencies of ascending region and descending region obtained from the combinations.

In this case, each of the distance detection unit 25 and the velocity detection unit 26 calculates the distances and the relative velocities based on the combination of the beat frequencies of the ascending region and the descending region.

The peak corresponding unit 27B determines data pairs of peaks for each of the ascending region and the descending region.

(Third Embodiment)

An electronic scanning radar apparatus in accordance with a third embodiment will now be explained with reference to figures.

Figure 19:
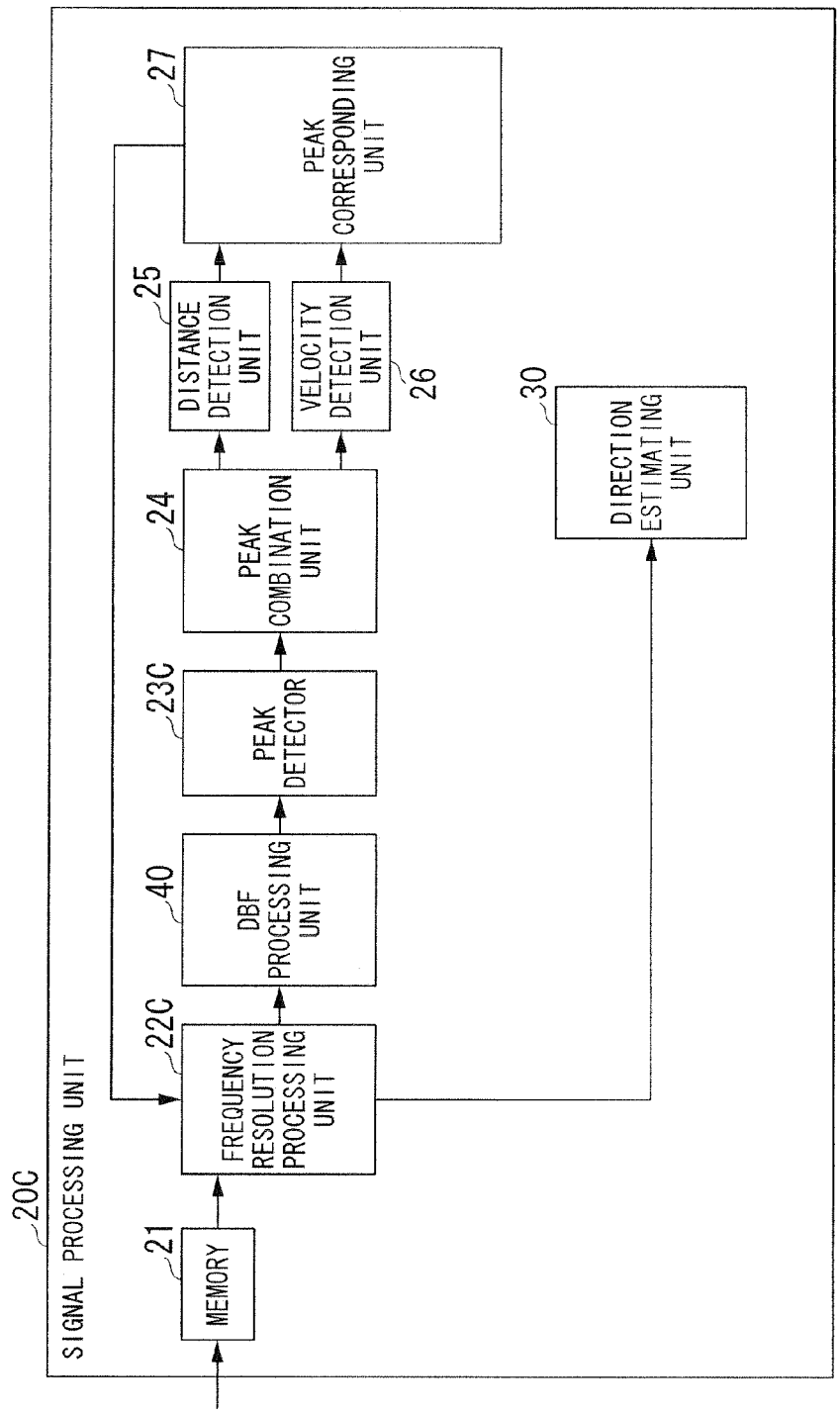
FIG. 19 a block diagram that illustrates a signal processing unit of an electronic scanning radar apparatus in accordance with a third preferred embodiment of the present invention.

FIG. 19 is a block diagram illustrating an example of the electronic scanning radar apparatus according to the present embodiment.

Unlike the case of the first embodiment, a signal processing unit 20C of the present embodiment uses a digital beam forming (DFB) process in advance for direction estimations, in which the resolution of DFB is lower than that of the AR spectrum estimation process or the like which includes a high resolution algorithm. After a first direction estimation is performed with the DBF, a second direction estimation is performed with the high resolution algorithm of the AR spectrum estimation process. For parts and configurations of FIG. 19 identical to those of FIG. 1 of the first embodiment, identical symbols are used and other parts different from FIG. 1 will be explained below.

As shown in the figure, a DBF processing unit 40 is provided between the frequency resolution processing unit 22C and the peak detector 23C in FIG. 1 of the first embodiment. The directions of receiving waves are detected by the DBF processing unit in advance. This is the different point from the case of the first embodiment as described above.

The frequency resolution processing unit 22C performs frequency conversion for each of the ascending region and the descending region of a triangular wave in discrete time domains using data sampled from beat signals stored in the memory 21. Namely, the frequency resolution processing unit 22C resolves beat signals into beat frequencies with a predetermined frequency width. The frequency resolution processing unit 22C calculates complex number data based on the beat signals resolved for respective beat frequencies and transmits the complex number data to the DBF processing unit 40.

Next, the DBF processing unit 40 receives the complex number data that correspond to receiving waves received by each of the antennas. The DBF processing unit 40 converts the complex number data by Fourier transformation along the arrayed direction of antennas, that is, the DBF processing unit 40 performs Spatial Fourier transformation.

Furthermore, the DBF processing unit 40 calculates spatial complex number data of each angle channel corresponding to the angle resolution, in which the spatial complex number data depend on angles. The DBF processing unit 40 transmits the spatial complex number data to the peak detector 23C.

Thereby, a spectrum transmitted by the DBF processing unit 40 is indicated by the spatial complex number data (each beat frequency) of each angle channel corresponding to the angle resolution. Thus, the spectrum transmitted by the DBF processing unit 40 depends on a direction estimation of receiving (incoming) waves with the beam scanning resolution.

Furthermore, as Spatial Fourier transformation is performed along the arrayed direction of antennas, it can be expected to obtain a similar effect which is obtained by adding the complex number data between angle channels. This improves the S/N ratios (signal to noise ratio) of the complex number data of each angle channel, so that the accuracy of peak detection can be improved, similar to the case of the first embodiment.

The complex number data and the spatial complex number data are obtained for both the ascending and descending regions of triangular waves by calculations, similar to the case of the first embodiment.

After the DBF processing unit 40 performs the data processing, the peak detector 23C detects peak values for respective angle channels based on data obtained by DBF processing. The peak detector 23C transmits the obtained peak values to the peak combination unit 24 by respective angle channels.

In other words, for the Spatial Fourier Transformation is performed for 16 resolutions, the number of angle channels corresponds to 15.

The peak combination unit 24 combines beat frequencies having peak values and the peak values of the ascending region and the descending region and transmits respective combination data to the distance detection unit 25 and the velocity detection unit 26. This process is similar to the case of the first embodiment.

Furthermore, the peak corresponding unit 27 receives distance data r and relative velocity data v from the distance detection unit 25 and the velocity detection unit 26, respectively, then the peak corresponding unit 27 generates the table of FIG. 5 for respective angle channels. Similar to the first embodiment, the peak corresponding unit 27 determines proper combinations of peaks of respective angle channels for the ascending region and the descending region respectively.

In resolutions of the DBF processing, an existence of a target is shown in plural angle channels. Then, the combinations of peaks can be properly performed for respective angle channels for the ascending region and the descending region, respectively.

Furthermore, the peak combination unit 24 combines peaks and generates target group numbers for the ascending region and the descending region, respectively. Each target group number indicates determined a distance r and a relative velocity v, so that, the table of FIG. 20 is formed. The table of FIG. 20 is used to store each determined pair of peaks for the ascending region and the descending region respectively.

The peak corresponding unit 27 obtains not only distances r and relative velocities v of targets, but also information on the angle channel of each target, so that the vertical position and the lateral position of the target can be obtained. So the peak corresponding unit 27 can form the table of FIG. 20 which includes detection results respectively corresponding to the target groups in the present detecting cycle.

Furthermore, the DBF processing unit 40 in accordance with the present embodiment detects the existence and the direction of each target based on complex number data and the digital beam forming process (DBF) that improves the sensitivity of receiving waves incoming from a desired direction.

The direction estimating unit 30 detects the directions of targets using the AR spectrum estimation method having a high resolution algorithm.

This enables to improve detecting accuracy of the direction of a target, even the DBF processing having a stable beam spectrum and lower resolution is performed in advance to perform accurate direction detections by the direction estimating unit 30.

When a direction estimation is performed using a logical operation (logical AND) based on both the direction information of the direction estimating unit 30 and the direction information of the DBF processing unit 40, the reliability of direction detections can be improved, and each information of directions of targets can be selectively used according to the purpose. For example, when the target locates in a close distance from the radar apparatus, the resolution of detecting angles may be relatively rough, so that the angle information of the DBF processing unit may be used.

(Fourth Embodiment)

An electronic scanning radar apparatus in accordance with a fourth embodiment will now be explained with reference to figures.

Figure 21:
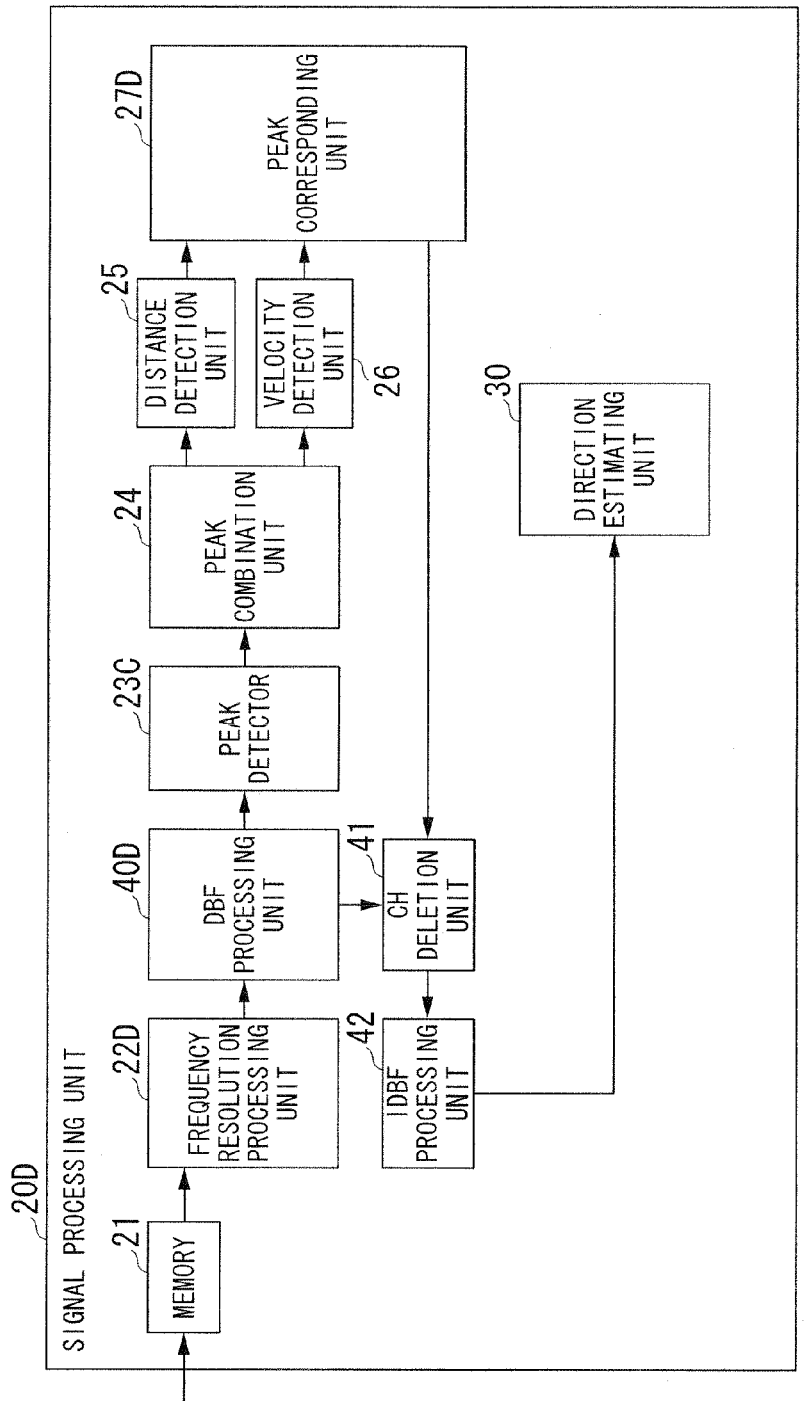
FIG. 21 is a block diagram of an electronic scanning radar apparatus in accordance with a fourth preferred embodiment of the present invention.

FIG. 21 a block diagram illustrating an electronic scanning radar apparatus of the present embodiment. Unlike the case of the first embodiment, a signal processing unit 20D of the present embodiment uses a digital beam forming (DFB) in advance for direction estimations which uses a high resolution algorithm such as an AR spectrum estimation process or the like, in which the resolution of DFB is lower than that of the AR spectrum estimation process or the like which includes a high resolution algorithm.

After a first direction estimation is performed with the DBF, a second direction estimation is performed with the high resolution algorithm of the AR spectrum estimation process.

For parts and configurations of FIG. 21 identical to those of FIG. 19 of the third embodiment, the identical symbols are used and other parts different from FIG. 19 will be explained below.

The present embodiment includes a channel deletion unit 41 and an IDBF processing unit 42 are added to the case of the third embodiment (FIG. 19).

The frequency resolution processing unit 22D performs frequency conversion for each of the ascending region and the descending region of a triangular wave in discrete time domains using data sampled from beat signals stored in the memory 21. Namely, the frequency resolution processing unit 22D resolves beat signals into beat frequencies with a predetermined frequency width. The frequency resolution processing unit 22D calculates complex number data based on the beat signals resolved for respective beat frequencies and transmits the complex number data to the DBF processing unit 40D.

Similar to the case of the third embodiment, the DBF processing unit 40D performs Spatial Fourier transformation for the complex number data. The DBF processing unit 40D calculates spatial complex number data and transmits the obtained spatial data to the channel deletion (Ch-deletion) unit 41 as well as to the peak detector 23C.

Figure 22A:
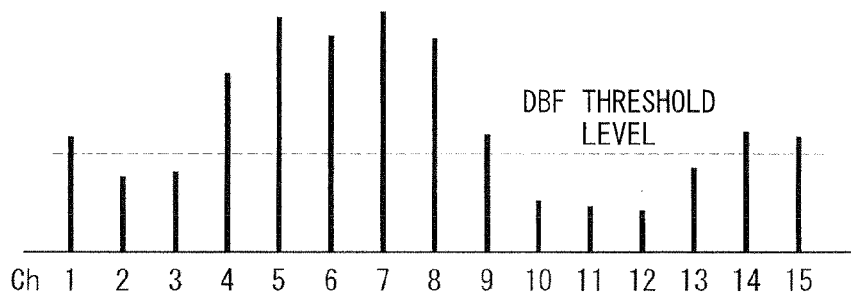
FIGS. 22A, 22B, and 22C are conceptual diagrams for describing data processing of intensities of spectra for respective angle-channels.

As shown in FIG. 22A, the DBF processing unit 40D performs the spatial Fourier Transformation with 16 point resolutions in the arranged direction of the receiving antennas, resulting a spectrum of 15 angle channels as a function of the angles. Then, the DBF processing unit 40 transmits the obtained spectrum to the Ch-deletion unit 41.

The Ch-deletion unit 41 detects signal levels if the signal levels (spectrum levels) exist adjacently and continuously within a predetermined angle range, and if the signal levels exceed a predetermined DBF threshold level. Each of the signal levels indicates the spatial complex number data. The spatial complex number data correspond to a peak frequency point (for example, at a descent) of a DBF target, which has been preliminary determined by the peak corresponding unit 27D. Further, the Ch-deletion unit 41 replaces the rest of the signal levels by "0." In this case, the rest of the signal levels are smaller than the predetermined DBF threshold. The Ch-deletion unit 41 transmits the obtained spatial complex number data to the Ch-deletion unit 41, in which the obtained spatial complex number data correspond to signal levels "0"

and the retained signal levels of the angle channels. The obtained spatial complex number data may be referred to as the narrowed data.

Figure 22B:
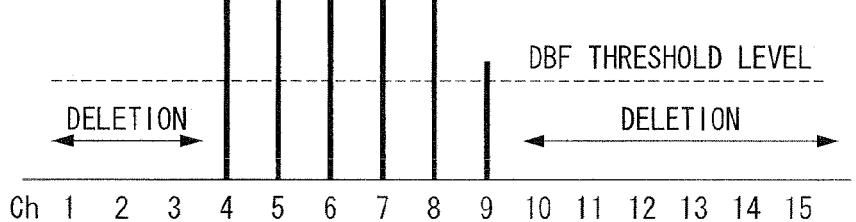

In the process described above, for example, if four or more than four adjacent angle channels have signal levels exceeding the predetermined DBF threshold level as shown in FIG. 22B, the Ch-deletion unit 41 determines that targets more than one exist in the range, and replaces the rest of the signal levels of the other angle channels by "0". This procedure may be referred to as a spectrum narrowing process. The spatial complex number data may be referred to as adjusted spatial complex number data.

The IDBF processing unit 42 narrows a spectrum. Namely, the IDBF processing unit 42 leaves only a predetermined number of continuous angle channels having levels beyond a DBF threshold value, and generates complex number data by replacing the other channels having levels below the DBF threshold value with "0."

Further, the IDBF processing unit 42 performs the partial inverse Fourier Transformation for the replaced spatial complex number data and forms the complex number data of frequency axis. The DBF processing unit 42 transmits the IDBF data to the direction estimating unit 30.

Further, the direction estimating unit 30 calculates a correlation matrix using the IDBF data received from the IDBF processing unit 42. The direction estimating unit 30 can obtain the correlation matrix with a proper orthogonality, which eliminates obstacles on the road side and reduces noises.

Figure 22C:
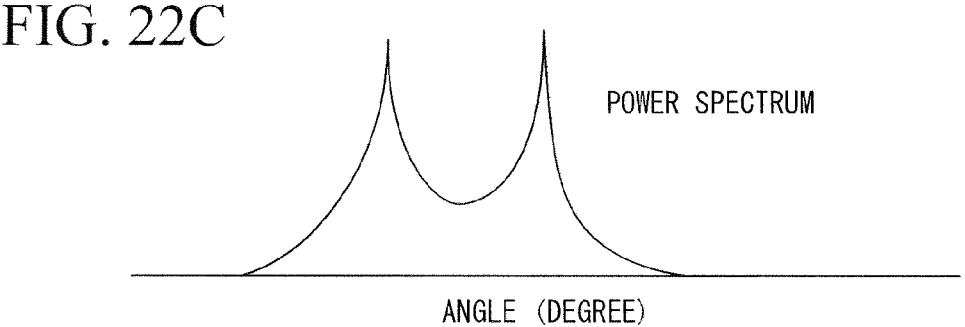

FIG. 22C is an example of a power spectrum that is obtained by forming a normal equation based on the correlation matrix formed from a target group of the DBF resolution of FIG. 22B using the method described above. In FIG. 22B, the vertical axis indicates the intensity of power spectrum, and the lateral axis indicates angles, in which the spectrum of FIG. 22B is further separated into the targets using the high resolution algorithm to obtain FIG. 22C. The term of "target group" is used for targets because there could be more than one target to be detected in an actual case.

Figure 23A:
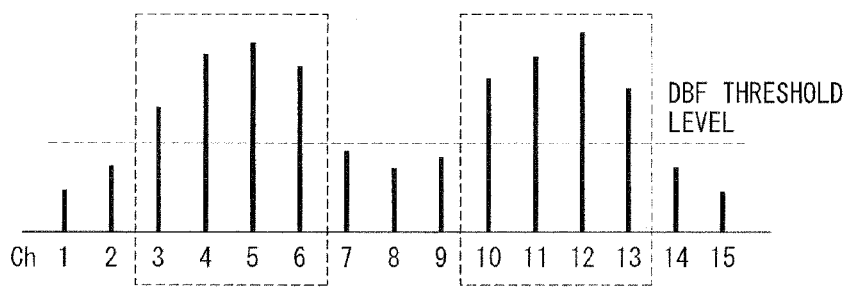
FIGS. 23A, 23B, and 23C are conceptual diagrams for describing data processing of intensities of spectra for respective angle-channels.

As shown in FIG. 23A, when the electronic scanning radar apparatus receives receiving waves reflected by plural targets, the complex number data received from the DBF processing unit 40D will include a plurality of ranges of continuous angle channels where the intensity levels of the continuous angle channels exceed the DBF threshold level.

Further, the Ch-deletion unit 41 separates and identifies the individual spatial complex number data for the ranges of angle channels.

When the received complex number data include signal levels for adjacent continuous angle channels, and the signal levels of the adjacent continuous angle channels exceed the DBF threshold level within a predetermined range of angle channels, the Ch-deletion unit 41 extracts the signal levels from the predetermined range and replaces the rest of the signal levels at the rest of the range by "0."

Figure 23B:
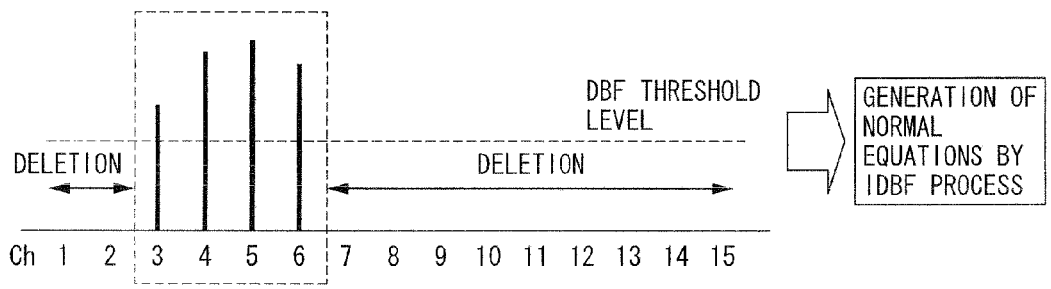
Figure 23C:
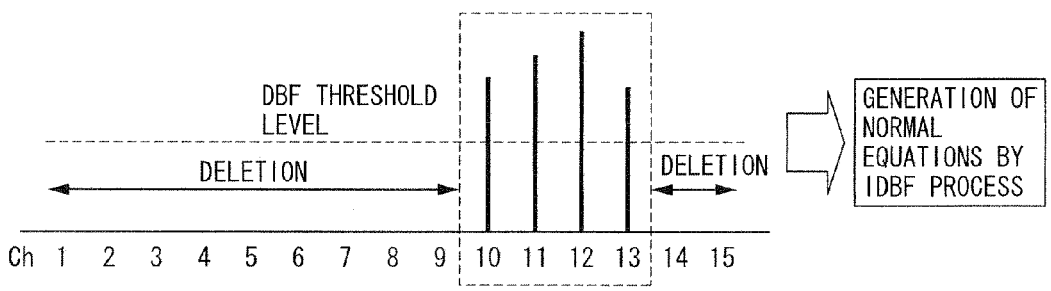

Thus, the Ch-deletion unit 41 identifies and separates the individual spatial complex number data for the ranges of angle channels, as shown in FIG. 23B and FIG. 23C. The peak corresponding unit 27D obtains the distance, the relative velocity, the vertical position and the lateral position, and transmits them to the Ch-deletion unit 41 as well as to the target link unit 32, which is similar to the case of the first embodiment.

The Ch-deletion unit 41 selects the spatial complex number data corresponding to the frequency point of a DBF target. After performing data deletion according to the method described above, the Ch-deletion unit 41 transmits the obtained data to the IDBF processing unit 42.

The IDBF processing unit 42 performs Inverse Spatial Fourier Transformation for the data received from the Ch-deletion unit 41. The IDBF processing unit 42 generates and transmits the IDBF data of the frequency axis to the direction estimating unit 30.

Furthermore, the DBF processing unit 40D in accordance with the present embodiment calculates a data set of spatial complex number data which indicates a spectrum intensity of each angle channel corresponding to a desired direction established based on digital beam forming process. When the spectrum intensities of adjacent angle channels in a predetermined angle channel width (range) become greater than a predetermined DBF threshold value, the DBF processing unit 40D detects an existence of a target and recognizes the target as a DBF detection target. Further, the DBF processing unit 40D replaces all the spectrum intensities of other angle channels detecting no target by "0." The Ch deletion unit 41 transmits the replaced data as a new data set of spatial complex number data to the IDBF processing unit 42. The IDBF processing unit 42 receives the new data set from the Ch deletion unit 41 and generates a restored dataset of complex number data by performing the inverse conversion for the new dataset of spatial complex number data. The normal equation generation unit 301 generates obtains a covariance matrix from the restored dataset of complex number data.

Furthermore, when detecting plural DBF detection targets, the Ch deletion unit 41 in accordance with the present invention divides power spectra into angle channel ranges respectively corresponding to DBF detection targets, and generates datasets of spatial complex number data corresponding to the number of the DBF detection targets. The IDBF processing unit 42 performs the inverse DBF conversion for datasets of spatial complex number data of each DBF detection target, so that the restored datasets of complex number data are generated for each DBF detection target. The normal equation generation unit 301 obtained the correlation matrix of each dDBF detection target by performing calculation based on the resorted dataset of complex number data of each DBF detection target.

According to the data processing described above, the spectrum narrowing process can be made for the range of detecting direction when the spectra are calculated at the AR spectra estimation process of the direction estimating unit 30. This can further improve the resolutions.

Further, in the present embodiment, it becomes an equivalent case where the direction estimating unit 30 virtually receives a receiving wave divided by each target group for the correlation matrix used to calculate AR coefficients. Thereby, even if the receiving antennas and the sub-array receive incoming waves of targets which are more than the number of the receiving antenna and sub-array and the number of setting orders, it becomes possible to accurately calculate AR coefficients.

In step S101 of the flowchart in FIG. 14, complex number data are repeatedly detected. Then, the complex number data time-sequentially generate normal equations. A traveling time average process is applied to the normal equations, so that accuracy of spectra and estimations of the orders can be improved.

As a specific process, for example, elements of each order of generated normal equations are stored into the storage area.

The elements of the normal equations consist of a covariance matrix, AR coefficients (vector) and a right hand side vector as units.

In steps S102, S104, and S106, the direction estimating unit 30 takes an averaged covariance matrix and AR coefficients based on a right hand side vector when obtaining AR coefficients. Then an averaging process is performed for the AR coefficients. An averaged covariance matrix and a right hand vector are obtained by performing the traveling time average process for between a past covariance vector and a past right hand vector processed in the past detecting cycle and the present covariance vector and the present right hand vector detected in the present detecting cycle. The averaging process of AR coefficients are obtained by performing the traveling time average process for between a past AR coefficient detected in the past detecting cycle and the present AR coefficient detected in the present detecting cycle. For example, the traveling time average process for the covariance matrix method can be seen in Japanese Unexamined Patent Application, First Publication No 2009-156582.

The direction estimating unit 30 performs data processing after the step S1089 based on the AR coefficient and the variance of white noise led from the normal equation performed by the traveling time average process. Thereby, determinations with low detecting errors can be performed and the accuracy of target detection can be improved.

Furthermore, the electronic scanning radar apparatus in accordance with the present embodiment is mounted on a moving body.

The reception part of the apparatus includes a plurality of receiving antennas 1-1 through 1-n which receive incoming waves, in which the incoming waves are reflection waves of a transmission wave reflected by a target (or targets).

The mixers 2-1 through 2-n generate beat signals from the transmission waves and the receiving waves. The frequency resolution processing unit 22 of the signal processing unit 20 performs the frequency resolution for the beat signals into beat frequencies with a predetermined frequency band width, and calculates datasets of complex number data based on the beat frequencies. The peak detector 23 detects the existence of the target by detecting a peak value from the intensities of beat frequencies. The direction estimating unit 30 calculates the incoming direction of receiving waves based on the normal equation with a selected order according to the number of receiving waves, in which the normal equations have different orders generated based on the complex number data of detected beat frequency which has detected a target for each antenna.

Thereby, for the normal equations obtained by the AR spectrum estimation method, AR coefficients and variances of white noise can be obtained from normal equations having different orders. The operation process using the obtained AR coefficient and the variance value of white noise makes it possible to calculate the number of receiving waves with light calculation load.

Furthermore, in the direction estimating unit 30, the normal equation generation unit 301 generates normal equations having different orders based on a covariance matrix and a right hand side vector obtained from complex number data, in which the normal equation which has a covariance matrix, AR coefficient and a right hand side vector as elements. The AR coefficient calculation unit 302 obtains an AR coefficient having an order according to the order of the generated normal equation based on the AR model indicated by the normal equation having different order. The determination unit 303 determines the number of receiving waves based on the obtained AR coefficient. The power spectrum calculation unit 304 calculates the direction of the receiving wave from the power spectrum obtained based on the AR coefficient having an order which is selected according to the determined number of receiving waves.

Thereby, the direction estimating unit 30 can calculate the direction of the receiving wave based on the number of receiving waves determined by the determination unit 303. The power spectrum calculation unit 304 chooses the order of the AR coefficient from AR coefficients having different orders. The power spectrum calculation unit 304 calculates the direction of the receiving wave which is obtained based on the AR coefficient having the chosen order.

Furthermore, the AR coefficient calculation unit 302 obtains the variance value of white noise having an order corresponding to the order of the normal equation, based on the AR model indicated as normal equations having different order.

The determination unit 303 determines the number of receiving waves based on the obtained variance value of white noise.

Thereby, the direction estimation unit 30 can determine the number of receiving waves based on two parameters led from the normal equations having different orders.

Furthermore, for the direction estimating unit 30 in accordance with the present embodiment, the different orders correspond to a plurality of orders indicated by any natural numbers. For the direction estimating unit 30 in accordance with the present embodiment, the different orders are orders expressed by continuous natural numbers being indicated from 1 to any natural number.

Thereby, the operating process can be performed by the limited information of orders, which can reduce the calculation load (operation load).

Furthermore, the order of the normal equation in accordance with the present embodiment is set to be greater than the number of detected targets.

Also, in the direction estimating unit 30, the order of AR coefficients is selected according to the number of determined receiving waves. When the determination unit 303 determines the number of receiving waves to be "1," the direction estimating unit 30 sets the order of AR coefficients to be a first order or a second order.

In this way, it can avoid error peaks that can be generated when a data processing is performed for AR coefficients of a high order.

As described above, the descriptions of the first through eighth embodiments of the present invention have been made for FMCW type radars using FIG. 1, these embodiments can be applied to other type FMCW radars which use other types of antennas.

Further, the present embodiments can be applied to other types of radars such as multiple continuous wave CW radars, pulse radars or the like.

In the present embodiment, the data processing is explained as examples, in which a direction is obtained by calculating peaks of a power spectrum. In stead of obtaining the power spectrum, the direction may be estimated based on a pole obtained by a calculation for solving a high order equation.

The Modified Covariance Method described in the present embodiment is known as the Forward and Backward Linear Prediction Method, or simply referred to as the FBLP method.

Further, in the present embodiment, an example has been given for a case where three targets were to be detected. However, the number of targets is not limited to three. It can apply to any number of targets.

Although the third order normal equation is described as an example in the present embodiment, an arbitrary order of equation can be chosen according to the required number of targets to be detected as long as the original number of channels is not limited.

Further, a receiving wave direction estimation program may be recorded into computer readable recording media to achieve the functions of control units 20, 20B, 20C and 20D in FIGS. 1, 17, 19, and 21. The programs recorded in the media may be read by a computer system and be performed. Thereby, the direction estimation may be performed based on receiving waves. The correlation matrixes may be performed by the averaging process to obtain significant effects of improving the accuracy of the detection.

In this case, the "computer system" may include an operation system and hardware such as a peripheral apparatus or the like. The "computer system" may include a system which can display home pages (or the like) and www ('world wide web') networks.

The "computer readable recording media" may include a flexible disk, an optical magnetic disk, ROM, CD-ROM or the like, and a hard drive installed in the computer system. Further, the "computer readable recording media" may include an apparatus such as a server or a volatile memory (RAM or the like) installed in the computer system, which can temporarily store the programs.

Further, the programs described above may be transmitted from a storage device or the like included in the computer system to another computer system via transmission media or a transmission wave in the transmission media.

The "transmission media," which transmits the programs, include a medium which has a function capable of transmitting information, similar to networks such as the Internet or the like, and communication lines such as telephone lines or the like. The communication network may include wireless networks.

The programs described above may be able to achieve part of the function described above. Further, the functions described above may be used by combination with programs which are already installed in the computer system, i.e., the programs may be differential files or differential programs.

As used herein, the following directional terms "forward, rearward, above, downward, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, a section or a part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electronic scanning radar apparatus, which is mounted on a moving body, the electronic scanning radar apparatus comprising:

a transmission unit configured to transmit a transmission wave;

a receiving unit including a plurality of antennas receiving a receiving wave coming from a target, the receiving wave being formed from a reflection wave of the transmission wave reflected at the target;

a beat signal generation unit configured to generate beat signals in response to the transmission wave and the receiving wave;

a frequency resolution processing unit configured to obtain complex number data calculated from beat frequencies having signal levels obtained by performing a frequency resolution for the beat signals based on a predetermined frequency width;

a peak detector configured to detect an existence of the target by detecting peak signal levels of the beat frequencies; and a direction detecting unit configured to calculate an incoming direction of the receiving wave based on a normal equation having an order, the order being selected in response to a number of receiving waves led from normal equations having different orders, each of the beat frequencies being obtained from each of the antennas, the normal equations having the different orders formed based on the complex number data of the beat frequencies having detected the existence of the target.

2. The electronic scanning radar apparatus as claimed in claim 1, wherein the direction detecting unit comprises:

a normal equation generation unit configured to generate the normal equation based on a covariance matrix and a right hand side vector, the covariance matrix and the right hand side vector being obtained from the complex number data having different orders, each of the normal equations being expressed by a linear equation having elements, the elements including the covariance matrix, an AR coefficient and the right hand side vector;

an AR coefficient calculation unit configured to obtain the AR coefficient having an order corresponding to the order of the normal equation based on an AR model expressed by normal equations having different orders;

a determination unit configured to determine a number of receiving waves based on the AR coefficient obtained by the AR coefficient calculation unit; and a power spectrum calculation unit configured to calculate an incoming direction of the receiving wave from a power spectrum obtained based on the AR coefficient having an order selected in response to the number of receiving waves determined from the obtained AR coefficient.

3. The electronic scanning radar apparatus as claimed in claim 2, wherein the AR coefficient calculation unit leads a variance value of white noise having an order of the variance value corresponding to the order of the normal equation based on the AR model, and the determination unit determines the number of the receiving waves based on the variance value and the obtained AR coefficient.

4. The electronic scanning radar apparatus as claimed in claim 1, wherein the different orders of the normal equations are a plurality of orders expressed by any natural numbers.

5. The electronic scanning radar apparatus as claimed in claim 1, wherein the different orders of the normal equations are continuous natural numbers indicated from 1 to any natural number.

6. The electronic scanning radar apparatus as claimed in claim 1, wherein the order of the normal equation is set to be greater than a number of targets.

7. The electronic scanning radar apparatus as claimed in claim 2, wherein when the number of receiving waves is determined to be one, an order of the AR coefficient is set to be one or two according to the number of the receiving waves.

8. The electronic scanning radar apparatus as claimed in claim 1, further comprising:
a DBF processing unit configured to detect the existence of the target and a direction of the target using a digital beam forming process based on the complex number data, wherein the digital beam forming process increases a detecting sensitivity of the receiving waves for a predetermined direction, and the peak detector detects the direction of the target based on the digital beam forming process performed for the beat frequencies.

9. The electronic scanning radar apparatus according to claim 8, wherein the DBF processing unit comprises:
a channel deletion unit configured to calculate spatial complex number data indicating spectrum intensities for respective angle channels corresponding to the predetermined direction determined based on the digital beam forming process of the DBF process unit, when each of the spectrum intensities of adjacent angle channels within a predetermined range of the angle channels exceeds a predetermined threshold level, the channel deletion unit remains each of the spectrum intensities and detects the existence of the target as a DBF target, the channel deletion unit replaces the spectrum intensities of the rest of the angle channels having the intensities smaller than the predetermined threshold level by zero and generates renewed spatial complex number data based on the remained and replaced intensities; and
an IDBF process unit configured to generate restored complex number data by performing an inverse digital beam forming process for the renewed spatial complex number data, wherein the normal equation generation unit generates a normal equation by obtaining a correlation matrix from the restored complex number data.

10. The electronic scanning radar apparatus according to claim 9, wherein when the channel deletion unit detects a plurality of DBF targets, the channel deletion unit divides a spectrum of the DBF targets into channel ranges respectively corresponding to the DBF targets and generates spatial complex number data, and a number of datasets of the spatial complex number data corresponds to a number of the DBF targets, and
the electronic scanning radar apparatus further comprises:
an IDBF forming unit configured to perform the inverse digital beam forming process for the spatial complex number data and generate renewed complex number data respectively corresponding to the DBF targets, and the normal equation generation unit calculates a correlation matrix for each of the DBF targets based on the renewed complex number data.

11. A method of estimating an incoming direction of a receiving wave, the method comprising:
transmitting a transmission wave;
receiving a receiving wave by a plurality of antennas, the receiving wave coming from a target;
generating beat signals in response to the transmission wave and the receiving wave;
performing a frequency resolution for the beat signals into a predetermined number of frequencies and obtaining complex number data;
detecting peak signal levels of the beat frequencies and detecting an existence of the target; and
calculating an incoming direction of the receiving wave based on a normal equation having an order, the order of the normal equation being selected in response to a number of receiving waves obtained from normal equations, each of the normal equations having different orders formed based on the complex number data of each of the beat frequencies having detected the existence of the target.

12. A computer-readable storage media storing a receiving wave direction estimation program for causing a computer to control an electronic scanning radar apparatus, which is mounted on a moving body, the receiving wave direction estimation program comprising:
transmitting a transmission wave;
receiving a receiving wave by a plurality of antennas, the receiving wave coming from a target;
generating beat signals in response to the transmission wave and the receiving wave;
performing a frequency resolution for the beat signals into a predetermined number of frequencies and obtaining complex number data;
detecting peak signal levels of the beat frequencies and detecting an existence of the target; and
calculating an incoming direction of the receiving wave based on a normal equation having an order, the order of the normal equation being selected in response to a number of receiving waves obtained from normal equations, each of the normal equations having different orders formed based on the complex number data of each of the beat frequencies having detected the existence of the target.

\* \* \* \* \*